(12) United States Patent
Viger et al.

(10) Patent No.: US 12,500,842 B2
(45) Date of Patent: Dec. 16, 2025

(54) COMMUNICATION METHODS FOR LATENCY SENSITIVE STREAMS AND MULTILINK APPARATUS

(71) Applicant: CANON KABUSHIKI KAISHA, Tokyo (JP)

(72) Inventors: Pascal Viger, Janze (FR); Patrice Nezou, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 18/568,217

(22) PCT Filed: Jun. 10, 2022

(86) PCT No.: PCT/EP2022/065869
§ 371 (c)(1),
(2) Date: Dec. 7, 2023

(87) PCT Pub. No.: WO2022/258821
PCT Pub. Date: Dec. 15, 2022

(65) Prior Publication Data
US 2024/0291763 A1    Aug. 29, 2024

(30) Foreign Application Priority Data

Jun. 10, 2021   (GB) ...................................... 2108299
Dec. 13, 2021   (GB) ...................................... 2118024

(51) Int. Cl.
*H04L 47/24*    (2022.01)
(52) U.S. Cl.
CPC ................... *H04L 47/24* (2013.01)

(58) Field of Classification Search
None
See application file for complete search history.

(56) References Cited

U.S. PATENT DOCUMENTS

2021/0329500 A1*  10/2021  Cariou .................. H04W 28/24
2022/0272566 A1*   8/2022  Nayak ..................... H04L 69/22
(Continued)

FOREIGN PATENT DOCUMENTS

| CN | 103404090 B | * | 3/2016 | ........... H04L 45/245 |
|---|---|---|---|---|
| EP | 4266738 A1 | | 10/2023 | |
| EP | 4272483 A1 | | 11/2023 | |

OTHER PUBLICATIONS

Dibakar Das, et al. (Intel); "SCS Procedure for EHT"; Feb. 2021; IEEE 802.11-21/0340r1; IEEE P802.11 Wireless LANs; pp. 1-7.
(Continued)

*Primary Examiner* — Natisha D Cox
(74) *Attorney, Agent, or Firm* — Canon U.S.A., Inc., IP Division

(57) ABSTRACT

Known stream classification service (SCS) has been improved for multi-link support. The low latency streams are identified with a SCSID. Improved SCS mechanisms may be used to allow a station to report link preference associated with low latency streams. Adapted SCS may also be used for negotiating a set of link for transmission of the low latency streams. An amended trigger frame may be used by the AP for scheduling the low latency streams. It is also proposed to adapt the target wake time (TWT) service period for allowing low latency dedicated TWT periods adapted to transmit streams identified with a SCSID.

11 Claims, 14 Drawing Sheets

(56) References Cited

U.S. PATENT DOCUMENTS

2022/0386372 A1* 12/2022 Xin .................. H04W 52/0209
2023/0370533 A1* 11/2023 Huang ................. H04L 43/062

OTHER PUBLICATIONS

Huang, Guogang (Huawei); "Proposed Draft Text for Transmit Stream/Category Measurement"; doc.: IEEE 802.11-21/0877r0; Apr. 15, 2021.
Das, Dibakar (Intel); "SCS Procedure for EHT"; doc.: IEEE 802.11-21/0340r0; Feb. 27, 2021; XP068179442; pp. 1-6.
Das, Dibakar (Intel); "SCS Procedure for EHT"; doc.: IEEE 802.11-21/0340r1; Feb. 27, 2021; XP068179100; pp. 1-7.
Ho, Duncan (Qualcomm Inc.); "TSPEC for Low Latency for R1"; doc.: IEEE 802.11-20/1693r2; Oct. 6, 2020; pp. 1-12.

* cited by examiner

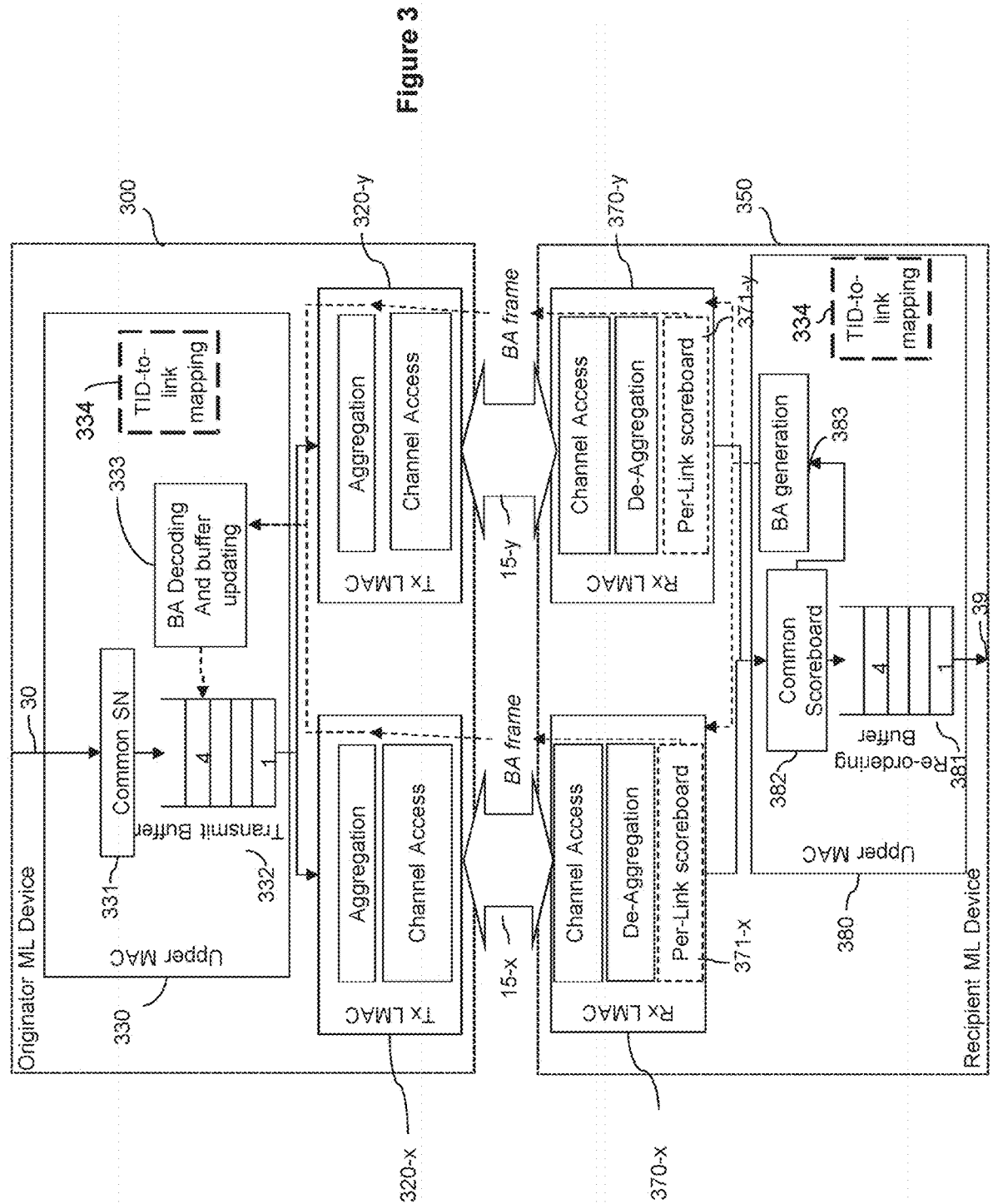

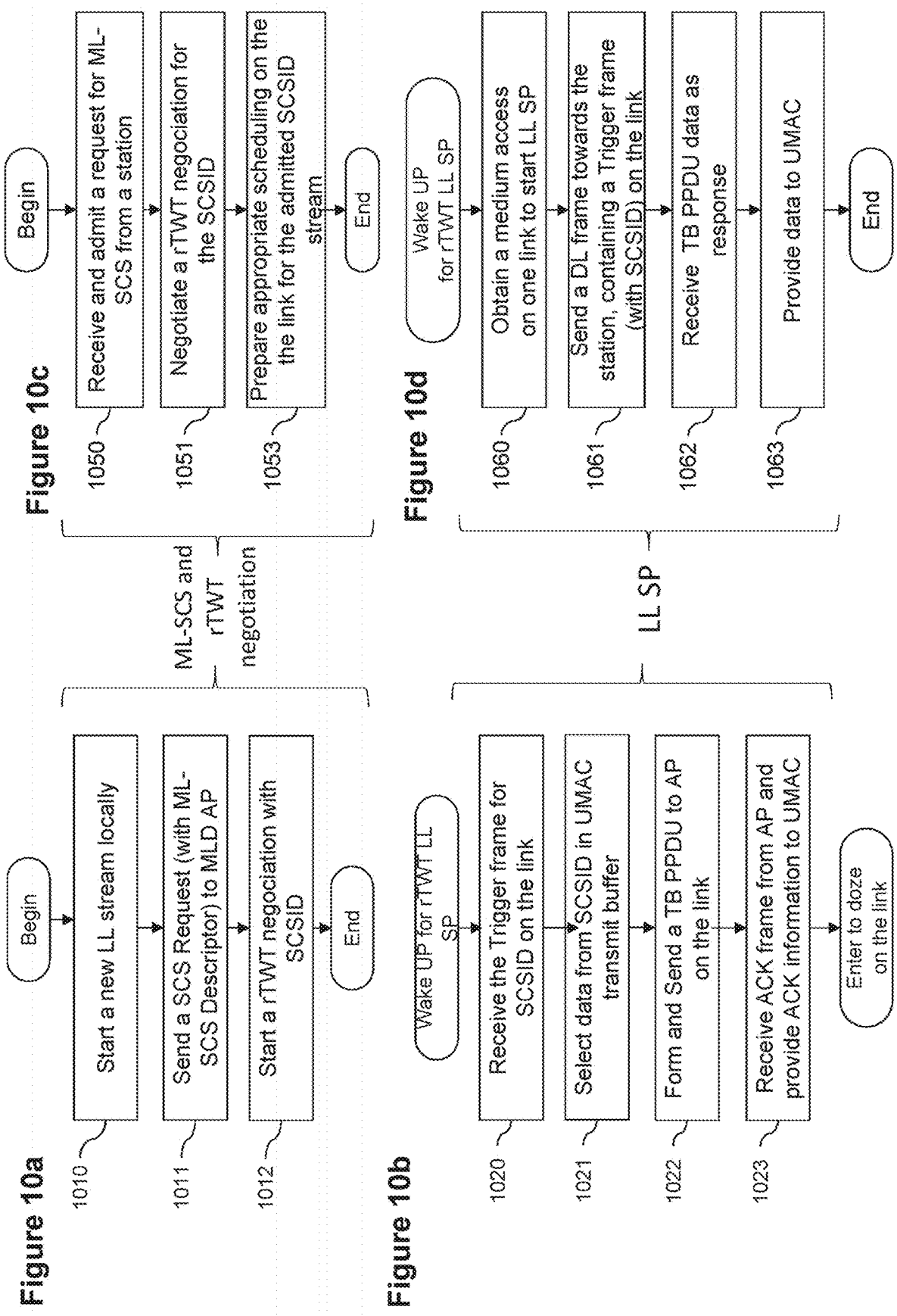

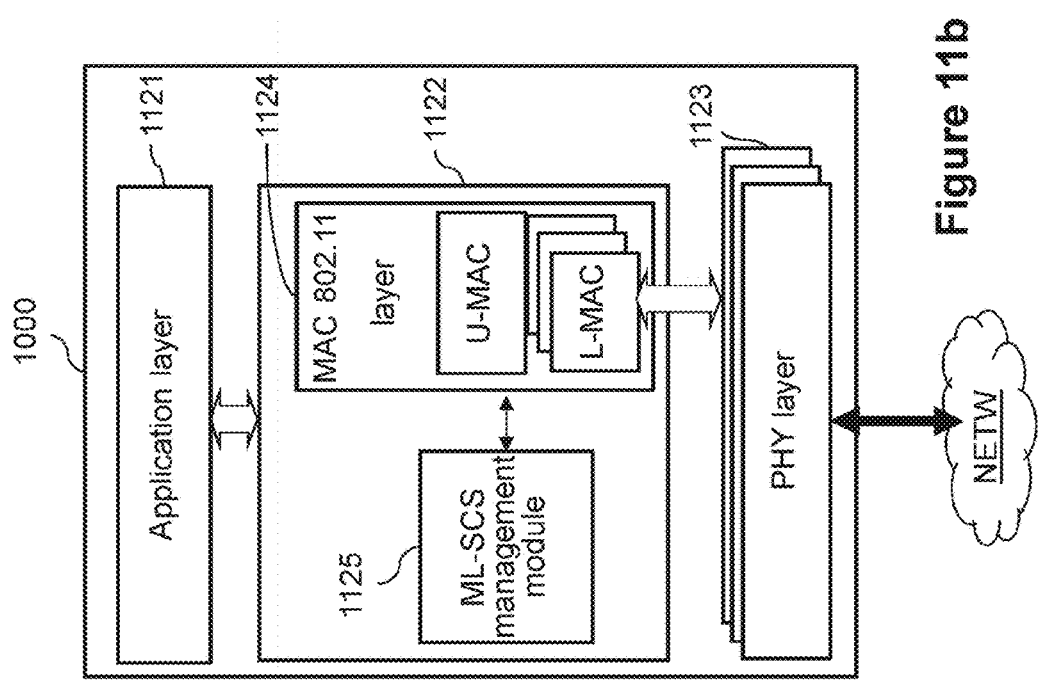
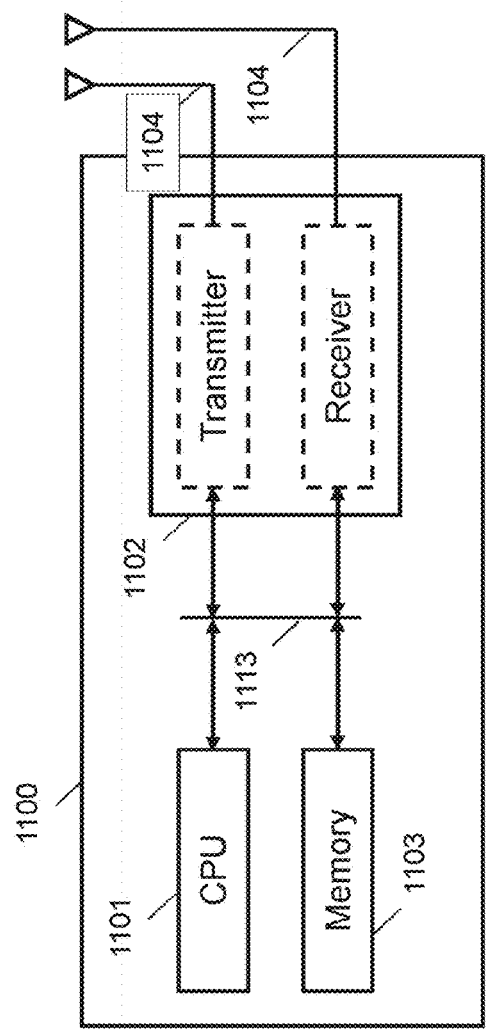
Figure 11a
Figure 11b

COMMUNICATION METHODS FOR LATENCY SENSITIVE STREAMS AND MULTILINK APPARATUS

CROSS-REFERENCE TO RELATED APPLICATIONS

This application is a National Phase application of PCT Application No. PCT/EP2022/065869, filed on Jun. 10, 2023 and titled "COMMUNICATION METHODS FOR LATENCY SENSITIVE STREAMS AND MULTILINK APPARATUS", which claims the benefit under 35 U.S.C. § 119(a)-(d) of United Kingdom Patent Application No. 2108299.5, filed on Jun. 10, 2021 and entitled "COMMUNICATION METHODS FOR LATENCY SENSITIVE STREAMS AND MULTILINK APPARATUS" and United Kingdom Patent Application No. 2118024.5, filed on Dec. 13, 2021 and entitled "COMMUNICATION METHODS FOR LATENCY SENSITIVE STREAMS AND MULTI-LINK APPARATUS". The above cited patent applications are incorporated herein by reference in their entireties.

FIELD OF THE INVENTION

The present invention generally relates to wireless communications and more specifically to Multi-Link (ML) communication.

BACKGROUND OF INVENTION

With the development of latency sensitive applications such as online gaming, real-time video streaming, virtual reality, drone or robot remote controlling, better throughput, low latency and robustness requirements and issues need to be taken into consideration. Such problematic issues are currently under consideration by the IEEE 802.11 working group as a main objective to issue the next major 802.11 release, known as 802.11be or EHT for "Extremely High Throughput".

Low latency reliable services, LLRS, have been defined as targets of such main objective. LLRSs are services provided to a higher layer traffic stream that prioritize and deliver MSDUs (data units) within a worst-case latency budget with a given reliability/packet delivery ratio (PDR) and low jitter.

The IEEE P802.11be/D1.0 version (May 2021) introduces the Multi-link (ML) operation (MLO). MLO improves data throughput by allowing communications between stations over multiple concurrent and non-contiguous communication links.

Multi-Link Operation enables a non-AP (access point) MLD (ML device) to register with an AP MLD, i.e. to discover, authenticate, associate and set up multiple links with the AP MLD. Each link enables channel access and frame exchanges between the non-AP MLD and the AP MLD based on supported capabilities exchanged during association.

A MLD is a logical entity that has more than one affiliated station (AP or non-AP) and has a single medium access control (MAC) service access point (SAP) to logical link control (LLC), which includes one MAC data service. An AP MLD is thus made of multiple affiliated APs whereas a non-AP MLD is made of multiple affiliated non-AP stations. The affiliated stations in both AP MLD and non-AP-MLD can use 802.11 mechanisms to communicate with affiliated stations of another MLD over each of the multiple communication links that are set up.

During ML discovery, a non-AP MLD discovers the various wireless links available by the AP MLD through its various affiliated APs. The non-AP MLD builds a set of candidate setup links associating affiliated APs with affiliated non-AP stations, from the discovered links (affiliated APs). During ML setup, the non-AP MLD, in collaboration with the AP MLD, determines a set of candidate setup links to be used for data exchange between the non-AP MLD and the AP MLD.

MLO device architecture still relies on the link-agnostic MAC procedures for buffering data, wherein local traffics are enqueued in the Access Category (AC) corresponding to their type of traffic (TID) priority, and then all data for a given TID or AC category can be delivered on a link enable to transport that category.

In trigger-based transmissions, the AP MLD gives an uplink transmission opportunity to one of the associated stations, which is granted by in a trigger frame on a given the link. However, when choosing a TID for the uplink transmission, the AP MLD does not offer any guarantee regarding the latency, reliability or jitter of the transmission, for LLRS traffic (compared to another traffic of same TID that is not latency sensitive).

Therefore, more efficient multilink communication mechanisms would be advantageous, particularly in view to provide low latency, LL, reliable services.

SUMMARY OF THE INVENTION

The inventors have found various alternative solutions to this particular problem. According to some aspect of the invention, Known stream classification service (SCS) has been improved for multi-link support. The low latency streams are identified with a SCSID. Improved SCS mechanisms may be used to allow a station to report link preference associated with low latency streams. Adapted SCS may also be used for negotiating a set of link for transmission of the low latency streams. An amended trigger frame may be used by the AP for scheduling the low latency streams. It is also proposed to adapt the target wake time (TWT) service period for allowing low latency dedicated TWT periods adapted to transmit streams identified with a SCSID. All these mechanisms may be used, alone or together, to improve the management of low latency services in a multi-link operation of the wireless network.

According to a first aspect of the invention, it is proposed a communication method in a wireless network, comprising by a non-access point multi-link device, non-AP MLD, associated with an access point multi-link device, AP MLD:

identifying a traffic stream by a stream classification service identifier, SCSID; and reporting to the AP MLD one or more links on which the identified traffic stream is expected to be transmitted.

In an embodiment, the one or more links are reported within respective one or more traffic specification elements, TSPEC, in a stream classification service descriptor associated with the traffic stream.

In an embodiment, the traffic specification element comprises an identifier of the link in a field designed for indicating a traffic stream identifier.

In an embodiment, the one or more links is reported within the stream classification service descriptor comprises a mapping element indicating a direction for the traffic and one or more links on which the traffic stream is expected to be transmitted.

In an embodiment, the stream classification service descriptor comprises:
one common traffic specification element comprising parameters defining the flow; and
one or more link specific traffic specification elements comprising link specific parameters.

In an embodiment, the method comprises:
receiving from the AP MLD a trigger frame allocating resources for the transmission of one or more identified traffic streams.

In an embodiment, a target wake time, TWT, is allocated for the transmission of the traffic stream.

In an embodiment, the trigger frame comprises:
one element indicating that the trigger frame comprises a traffic stream identifier; and
one element indicating the traffic stream identifier.

In an embodiment, the target wake time is described by an information element, TWT IE comprising a parameter information element comprising a single individual TWT parameter field comprising an identifier of the traffic stream.

In an embodiment, the target wake time is described by an information element, TWT IE comprising a parameter information element comprising one or more broadcast TWT parameter field each comprising an identifier of the traffic stream.

In an embodiment, the traffic stream is transmitted using data units comprising sequential serial numbers.

According to another aspect of the invention, it is proposed a computer program product for a programmable apparatus, the computer program product comprising a sequence of instructions for implementing a method according to the invention when loaded into and executed by the programmable apparatus.

According to another aspect of the invention, it is proposed a computer-readable storage medium storing instructions of a computer program for implementing a method according to the invention.

According to another aspect of the invention, it is proposed a communication device in a wireless network, comprising a non-access point multi-link device, non-AP MLD, associated with an access point multi-link device, AP MLD, wherein the non-AP MLD comprises a processor configured for:
identifying a traffic stream by a stream classification service identifier, SCSID; and
reporting to the AP MLD one or more links on which the identified traffic stream is expected to be transmitted.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 3 illustrates an exemplary 802.11be multi-link reference model for a ML device;

FIGS. 10a, 10b, 10c, and 10d illustrate, using flowcharts, exemplary embodiments of the invention implemented at AP and non-AP MLDs; and FIGS. 11a and 11b illustrate multi-link communication device hardware and software architecture according to at least one embodiment of the present invention.

DETAILED DESCRIPTION OF THE INVENTION

Figure 1:
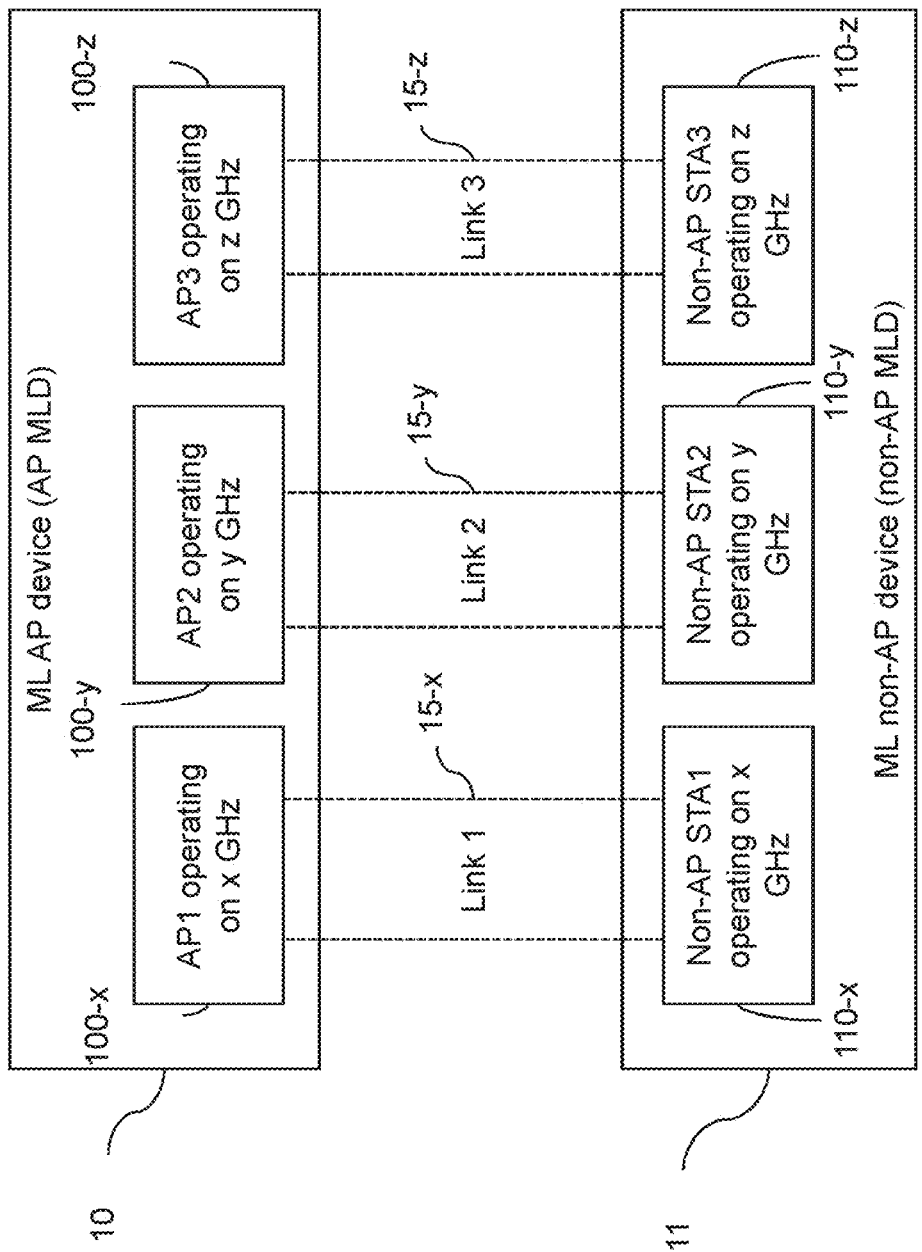
FIG. 1 illustrates an example of a multi-link arrangement in accordance with 802.11be.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. A SDMA system may utilize sufficiently different directions to transmit simultaneously data belonging to multiple user terminals, i.e. wireless devices or stations. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. A SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

Note that it is not excluded that an apparatus may act as an AP of one wireless network and at the same time may belong to another (neighboring) wireless network as a STA. This may occur in the context of Multi-AP technology, which consists in enabling some degree of collaboration among neighboring APs in order to have a more efficient utilization of the limited time, frequency and spatial resources available. With such a technology, two neighboring APs may share resources in terms of frequency or time and, in this way, prevents interferences. APs that collaborate to share resources are referred to as coordinated APs. Moreover, the data transmission established by coordinated APs is referred as Multi-AP transmission.

While the examples are described in the context of WiFi (RTM) networks, the invention may be used in any type of wireless networks like, for example, mobile phone cellular networks that implement very similar mechanisms.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

An AP manages a set of stations that together organize their accesses to the wireless medium for communication purposes. The stations (including the AP) form a service set, here below referred to as basic service set, BSS (although other terminology can be used). A same physical station acting as an access point may manage two or more BSS (and thus corresponding WLANs): each BSS is thus uniquely identified by a specific basic service set identification, BSSID and managed by a separate virtual AP implemented in the physical AP.

The 802.11 family of standards define various media access control (MAC) mechanisms to drive access to the wireless medium.

The current discussions in the task group 802.11be, as illustrated by draft IEEE P802.11be/D1.0 of May 2021, introduce the Multi-Link Operation (MLO) when it comes to MAC layer operation. The MLO allows multi-link devices to establish or setup multiple links and operate them simultaneously.

A multi-link device (MLD) is a logical entity and has more than one affiliated (AP or non-AP) station (STA) and has a single medium access control (MAC) service access point (SAP) to logical link control (LLC), which includes one MAC data service. Besides, the MLD also comprises a single address associated with the interface, which can be used to communicate on the distribution system medium (DSM).

The stations forming the same MLD may be partly or all collocated within the same device or geographically dispersed.

An access point multi-link device (AP MLD) then corresponds to a MLD where each station (STA) affiliated with the MLD is an AP, referred to as "affiliated AP" hereinafter.

A non-access point multi-link device (non-AP MLD) corresponds to a MLD where each station (STA) affiliated with the MLD is a non-AP station, referred to as "affiliated non-AP station".

When referring hereinafter to either an AP MLD or a non-AP MLD, the general term "station MLD" may be used.

Depending on the literature, "multilink device", "ML device" (MLD), "multilink logical entity", "ML logical entity" (MLE), "multilink set" and "ML set" are synonyms to designate the same type of ML device.

An example of two MLDs, an AP MLD 10 and a non-AP MLD 11 establishing a multilink communication session to exchange data units, in accordance with 802.11be is illustrated in FIG. 1.

As visible, the AP MLD 10 comprises three affiliated APs 100-$x$, 100-$y$, and 100-$z$ and the non-AP MLD 11 comprises three affiliated non-AP STAs 110-$x$, 110-$y$ and 110-$z$. Although illustrated MLDs are made of three affiliated non-AP stations or APs, MLD with another number of affiliated non-AP stations or APs may be contemplated with the same teachings.

Each station 100-$x$, 110-$x$, 100-$y$, 110-$y$, 100-$z$, or 110-$z$ is a logical entity that is a singly addressable instance of a medium access control (MAC) and physical layer (PHY) interface to the wireless medium.

Multiple affiliated non-AP stations of a non-AP MLD may then setup communication links with multiple affiliated APs of an AP MLD, hence forming a multi-link channel.

As visible in FIG. 1, the communication links 15-$x$, 15-$y$, 15-$z$ are physical paths usable to transfer MAC service data units (MSDUs) between an affiliated non-AP station and an affiliated AP. Thus, the communication link 15-$x$ is the communication channel established between the AP 100-$x$ and the non-AP STA 110-$x$. Similarly, the communication links 15-$y$ and 15-$z$ corresponds to the communication channels established between respectively the AP 100-$y$ and the non-AP STA 110-$y$, and the AP 100-$z$ and the non-AP STA 110-$z$.

A communication link or "link" thus corresponds to a given channel (e.g. 20 MHz, 40 MHZ, and so on) in a given frequency band (e.g. 2.4 GHZ, 5 GHZ, 6 GHZ) between an AP 100-$x$, 100-$y$, 100-$y$ affiliated with the AP MLD 10 and a non-AP STA 110-$x$, 110-$y$, 110-$z$ affiliated with the non-AP MLD 11.

As visible on FIG. 1, the AP 100-$x$ and the non-AP STA 110-$x$, the AP 100-$y$ and the non-AP STA 110-$y$, and the AP 100-$z$ and the non-AP STA 110-$z$ respectively operates at the following frequency bands, x GHz, y GHz and z GHz. These frequency bands may be different one from the other such that the corresponding communication links 15-x, 15-y, 15-z have the respective frequency bands, x GHz, y GHz and z GHz. Alternatively, the links may have the same frequency band, i.e. the STAs may use a same frequency band.

Preferably, the links established for MLDs are considered as fully independent, meaning that the channel access procedure (to the communication medium) and the communication are performed independently on each link. Hence, different links may have different data rates (e.g. due to different bandwidths, number of antennas, etc.) and may be used to communicate different types of information (each over a specific link).

The affiliated APs and non-AP stations may operate on their respective channels in accordance with one or more of the IEEE 802.11 standards (a/b/g/n/ac/ad/af/ah/aj/ay/ax/be) or other wireless communication standards.

Thanks to the multi-link aggregation, traffic associated with a single MLD can be transmitted across multiple parallel communication links, thereby increasing network capacity and maximizing utilization of available resources.

The terms "traffic" and/or "traffic stream(s)" as used herein, are defined as a data flow and/or stream between wireless devices.

Although FIG. 1 shows a ML AP device and a ML non-AP device establishing a ML communication session, two non-AP MLDs may also establish such a ML communication session.

Figure 2:
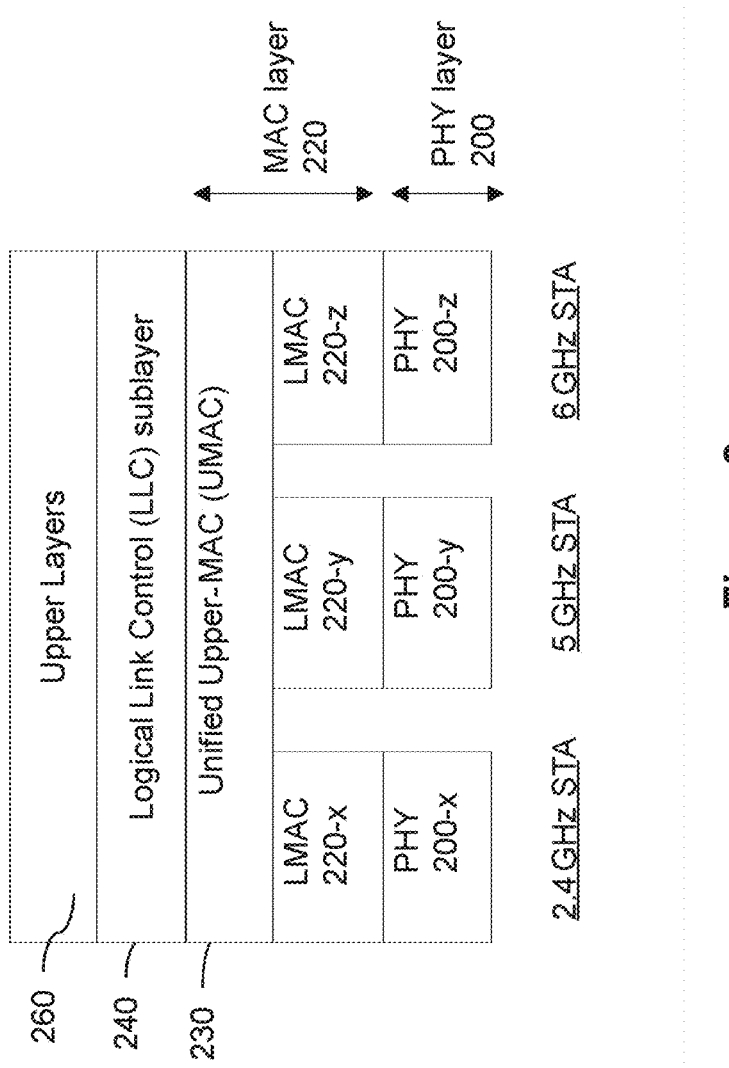
FIG. 2 illustrates an example of a reference model of a 802.11be multi-link device.

FIG. 2 illustrates an exemplary 802.11be multi-link reference model for a MLD either AP MLD (e.g. as AP MLD 10 of FIG. 1) or non-AP MLD (e.g. as non-AP MLD 11 of FIG. 1), which may be either originator MLD (i.e. device transmitting data) or a recipient MLD (i.e. device receiving the data from the originator MLD).

The MLD comprises a PHY layer 200, a MAC layer 220, a logical link control (LLC) sublayer 240 and upper layers 260.

Upper layers 260 may include applications that generate traffic data or use received traffic data.

The transmission and the receiving of the traffic data are handled by the MAC 220 and PHY 200 layers. Such transmission and the receiving of the traffic data may be over multiple links, as the one 15-x, 15-y, 15-z introduced with reference to FIG. 1.

The traffic data are provided as a sequence of data frames, known as MAC service data units (MSDUs). Each MSDUs are associated with an access category (AC) as defined in EDCA mechanism.

It is recalled that an 802.11 station (AP and non-AP station) maintains four Access Categories (ACs), and thereby four corresponding emission buffers (or transmission/traffic queues or buffers). Each AC has its own traffic queue/buffer to store corresponding data frames to be transmitted on the network. The four AC are conventionally defined as follows:

AC1 and AC0 are reserved for best effort and background traffic. They have, respectively, the penultimate lowest priority and the lowest priority.

AC3 and AC2 are usually reserved for real-time applications (e.g., voice or video transmission). They have, respectively, the highest priority and the penultimate highest priority.

The data frames, namely the MSDUs, incoming from an upper layer of the protocol stack are mapped onto one of the four AC queues/buffers and thus input in the mapped AC buffer. Therefore, an 802.11 station supports a traffic prioritization similar to DiffServ (Differentiated Services), and the mapping is performed between one of the eight priorities of traffic class of the incoming MSDU onto a corresponding one of the four ACs, according to a predefined mapping rules. The traffic class is indicated using a Traffic Identifier (TID) taking values in the range 0 to 7.

Therefore, each MSDU contains an indication relating to the type of data, that is to say, an indication reflecting an access category, in other words, a level of priority.

The 802.11be multi-link reference model reflects the fact that MLDs may transmit using several links, particularly at the level of the MAC layer 220 and the PHY layer.

The MAC layer 220 comprises a Unified Upper-MAC (UMAC) layer 230. The UMAC 230 is responsible for link-agnostic MAC procedures such as sequence number assignments, MAC Protocol Data Unit (MPDU) encryption/decryption, acknowledgement score boarding procedure, etc.

Thus, each data unit, MSDU, arriving at the MAC layer 220 from an upper layer 260 (e.g. Link layer) with a type of traffic (TID) priority is mapped into one of the ACs according to the mapping rule at the UMAC layer 230. Then, still at the UMAC layer 230, the data unit, MSDU, is then stored in a buffer corresponding to the mapped AC.

When an access to the wireless medium is granted, data units are transmitted to the physical (PHY) layer 200 for transmission onto the wireless communication network.

As mentioned before, the transmission may be performed using any of the communication links 15-x, 15-y, or 15-z illustrated on FIG. 1.

Hence, structures of MAC layer and PHY layer are adapted accordingly.

As visible on FIG. 2, the MAC layer 220 of the MLD further comprises multiple blocks, called lower MAC (LMAC) 220-x, 220-y, 220-z for respective multiple links 15-x, 15-y, 15-z.

PHY layer 200 of the MLD comprises multiple PHY blocks 200-x, 200-y, 200-z as well, each being dedicated for respective multiple links 15-x, 15-y, 15-z.

The UMAC layer then further offers a UMAC interface with the link-specific blocks 220-x, 220-y, 220-z (forming lower MAC sublayers, therefore referred to as LMAC) and provides a UMAC Service Access Point (SAP) to the LLC 240 and upper 260 layers.

Of course, the number of blocks depends on the number of links the MLD is able to manage.

In this example, LMAC layer 220-x may be associated with link 15-x via PHY layer 200-x; LMAC layer 220-y may be associated with link 15-y via PHY layer 200-y; and LMAC layer 220-z may be associated with link 15-z via PHY layer 200-z. In other words, each link 15x/y/z may have an associated LMAC layer 200-x/y/z that performs link-specific features, such as channel, e.g. link, access.

To access the wireless medium, i.e. the links 15-x, 15-y, 15-z, the non-AP stations and the APs active on a given link may compete using EDCA (Enhanced Distributed Channel Access) contention, in order to be granted a transmission opportunity (TXOP). Then, during the TXOP, the stations may transmit (single-user, SU) data frames. It shall be noted that legacy devices (that is to say not a MLD) may operate on any one of the links.

As an alternative, the stations may also use a multi-user (MU) scheme to access the wireless medium, i.e. the links 15-x, 15-y, 15-z. In the MU scheme, a single station, usually the AP 100-x, 100-y and 100-z, is allowed to schedule a MU transmission, i.e. multiple simultaneous transmissions to or from other non-AP stations. One implementation of such a MU scheme has been for example adopted in IEEE 802.11ax amendment standard, as the Multi-User Uplink and Downlink OFDMA (MU UL and DL OFDMA) procedures. Thanks to the MU feature, a non-AP stations has the opportunity to gain access to the wireless medium via two access schemes: the MU scheme and the conventional Enhanced Distributed Channel Access-EDCA scheme, SU scheme.

During a MU DL transmission on the granted communication channel, i.e. the link 15-*x*, the AP 100-*x* may perform multiple simultaneous elementary transmissions, over so-called resource units (RUs), to various non-AP stations. As an example, the resource units may split the link 15-*x* of the wireless network in the frequency domain, based for instance on Orthogonal Frequency Division Multiple Access (OFDMA) technique. The assignment of the RUs to the non-AP stations is signaled at the beginning of the MU Downlink frame, by providing an association identifier (AID) of a non-AP station for each RU defined in the transmission opportunity. AID is individually obtained by each MLD station during its association procedure with the AP 100-*x*. AID therefore uniquely identifies the associated MLD stations (and therefore the affiliated station of the MLD on the current link where the MU frame is emitted), and may be, for example, a 16-bit value.

During a MU UL transmission, various non-AP stations may simultaneously transmit data to the AP 100-*x* over the resource units forming the link 15-*x*.

To control the MU UL transmissions of the non-AP, the AP 100-*x* may previously send a control frame, known as a Trigger Frame (TF). The TF may be used by the AP 100-*x* to allocate resource units to the non-AP stations of the same BSS, using their AIDs assigned to them during the association procedure to the AP 100-*x* and/or using reserved AIDs designating a group of non-AP stations. The TF may also define the start of the MU UL transmission by the non-AP stations 110/170-*x*, the type of traffic (TID) that is requested (if any specific, otherwise it is station decision), as well as the length thereof.

When the stations involved in data transmission are affiliated with a MLD, e.g. the affiliated AP 100-*x* (with MLD 10) and the affiliated non-AP station 110-*x* (with MLD 11, see FIG. 1), the MLDs, being either originators or recipients, implements a protocol stack, introduced in the 802.11be specifications as described hereinbefore.

In order to better understand the function of each layer and the blocks of the 802.11be multi-link reference model of FIG. 2, a Multi-Link Operation (MLO), i.e. data transmission at AP or non-AP MLD 300 and data receiving at the AP or non-AP MLD 350, is now described with reference to FIG. 3.

This figure illustrates ML data transmissions between an originator MLD 300 and a recipient MLD 350. For simplification, the PHY layers are not shown.

The originator and recipient MLD may be both non-AP MLD 11 or AP MLD 10 or one may be an AP MLD 10 and the other may be a non-AP MLD 11.

Any MLD may include the blocks shown at the originator MLD 300 for transmission operations and those at the recipient MLD 350 for reception operations. In the illustrated example, the MLDs 300 and 350 share two links 15-*x*, 15-*y*. Of course, depending on the number of shared links between the MLDs, the number of blocks LMAC (TxLMAC and RxLMAC), may be adapted accordingly.

To perform multi-link communication, each non-AP MLD establishes a multi-link association with an AP MLD.

For the purpose of the association, the association framework allows the non-AP MLD to exchange frames with the AP-MLD.

In practice, one of the links (i.e. one of the affiliated stations of the non-AP MLD) may be used by the non-AP MLD to associate with the AP MLD (through the corresponding affiliated AP station of the AP MLD). This link may be considered as a "primary link" or "anchor link". Then, discovery procedures may be implemented to discover the other links that can be established between the same non-AP MLD and AP MLD.

Exchanged information during the association procedure may include BSS configuration, AP information on each link, i.e. information relating to the affiliated station of the non-AP MLD associated with each link, non-AP STA information on each link, i.e. information relating to the affiliated AP stations of the AP MLD associated with each link, capability of each link, Tx/Rx constraints of the multiple links.

Each time a MLD needs to exchange data with another associated MLD, it establishes a multilink communication session.

The multilink communication session first comprises a setup phase. During the setup phase, the originator MLD may exchange information and negotiate policies for the multiple links of the ML communication session. Also, one or more links may be established at a specific time: establishing a link means that each MLD has all the information to enable data operation (transmission or receiving) with the other MLD sharing that link.

The negotiated policies may include an acknowledgment (ack) scheme, in particular an agreement regarding the terms and capabilities for Block Acknowledgement (BA) procedure.

BA procedure proposes during a BA session to confirm the receiving of data transmitted using a link 15-*x* or 15-*y*, e.g., with the help of an add BA (ADDBA) request and response procedure, for each link.

When negotiating regarding BA procedure, the negotiating MLD may exchange capability information such as BA size (size of scoreboard bitmaps), buffer size, window size (e.g., a sliding window), the sequence number space to be used, and/or policy, and then agree on the common parameters to use. The obtained BA agreement may be later canceled (e.g., using a delete BA (DELBA) request).

The BA agreement is negotiated at the UMAC level 330, 380 for a given traffic, for example for a given value of TID, and this regardless of the one or more links to be used for the transmission of this traffic. Indeed, thanks to the multilink scheme, the data units belonging to the same TID can be simultaneously transmitted over multiple links.

For each BA agreement (i.e. in case several TIDs are transmitted in parallel), there is an associated reordering buffer at recipient MLD.

The BA procedure may be better understood with the illustrated transmission from the originator MLD 300 to the recipient MLD 350.

The UMAC 330 of the originator MLD 300 receives application data 30 as an input to be transmitted to the recipient MLD 350. Application data may be in the form of several MSDUs. Based on the received MSDUs, the UMAC may form individual MPDUs associated to the received MSDUs or an A-MSDU according to an A-MSDU aggregation.

Then, data units are stored in the transmit queue or buffer 332, and are associated with sequence numbers to keep information regarding their order.

For example, the UMAC 330 attaches a sequence number (SN) to the MPDUs at block 331 and allocates these MPDUs to a common transmit queue 332. The sequence numbering is determined using a starting sequence number and the sequence number space, which is the difference between two consecutive sequence numbers. Information relating to sequence numbering is shared between the originator MLD 300 and the recipient MLD 350.

Alternatively, the common transmit queue 332 may store directly MSDUs (and not MPDUs), each being associated to a SN by the UMAC. In this case, the sequence numbering is chosen in order to ensure that the SN of MSDU frame(s) corresponds to a given MPDU encapsulation.

The common transmit queue 332 is a single transmit queue used for all four ACs, i.e. all traffics. According to some embodiments, multiple transmit queues may be used, each of which being associated with a respective AC.

The stored data units may then be routed from the transmit queue 332 to one of Tx LMAC 320-$x$ or Tx LMAC 320-$y$ layers (i.e. to one of its affiliated stations), usually depending on the allocation of data units (MPDUs) to the multiple links 15-$x$, 15-$y$ which is performed by the UMAC 330. For example, if link 15-$x$ provides communication resources for the MLD originator 300, then the data units are routed to the Tx LMAC 320-$x$ layer.

The data units may then be transmitted over the multiple links, for instance using MPDU aggregation and channel access.

MU schemes and SU schemes may be used for the data transmission over a given link independently of the multiple links. In particular, one of MU schemes that has been adopted by the IEEE in the 802.11ax-2021 standard, could be implemented independently on each link.

The transmitted data units are then received by the recipient MLD 350 through its multiple affiliated stations, i.e. through its multiple Rx LMAC 370-$x$, 370-$y$ layers according to the link 15-$x$, 15-$y$ on which the originator has transmitted the data units.

At the recipient MLD 350, a block acknowledgment (BA) may be independently performed per link.

To do that, a scoreboard, blocks 371-$x$ and 371-$y$, may be built, listing the received data units. Next, the scoreboard may be sent to the originator MLD as a BA frame, upon receiving a request from the MLD originator, i.e. BA Request, or upon receiving a number of data units, over the corresponding link.

For example, during a TXOP session on one of the links 15-$x$ or 15-$y$, the BA frame is sent by the recipient MLD 350 in order to close de communication according to the "Immediate Block Ack" policy which specifies that the BA frame should be received during the TXOP session.

The per-link scoreboard 370-$x$, 370-$y$ may be a BA bitmap comprising bits associated with respective sequence number (from an agreed starting sequence number, SSN). The bits may respectively take the 0-value if the data unit with the corresponding sequence number has not been correctly received over the associated link at the time of building the bitmap or the 1-value if the data unit has been correctly received. The BA bitmap may be generated for a particular traffic, e.g. based on a TID value.

According to some embodiments, per-link scoreboards 370-$x$, 370-$y$ may be implemented as partial-state of reception.

The BA mechanism aggregates several acknowledgements into one frame which improves channel efficiency.

The received and decoded data units are forwarded by each Rx LMAC 370 layer to UMAC 380 layer for storage in a common re-ordering buffer 381 (i.e. a common receive queue). In that way, the UMAC layer 380 may consolidate the data units arriving over the multiple links, perform BA scoreboarding, MPDUs reordering, etc. Again, a shared common re-ordering buffer 381 may be used for the four EDCA ACs, or multiple re-ordering buffers may be used.

As illustrated, the recipient MLD 350 may also maintain a common scoreboard 382 to keep a longer-term record of the received data units for multilink data transmissions for a given TID, not limited by TXOPs.

The common scoreboard 382 may be implemented as full-state. The common scoreboard 382 may be updated regularly with the content of the per-link scoreboards 370-$x$, 370-$y$. For example, the common scoreboard is updated every time a per-link scoreboard is updated, or at least at the end of TXOPs of each link. The common scoreboard has thus a bigger size than the per-link scoreboards 370-$x$, 370-$y$. Still, the common score board is generated for a given TID.

The common scoreboard 382 is used by the BA generation block 383 to generate a BA frame.

The BA frame is transmitted to the originator MLD 300 using one or more of the multiple links 15-$x$, 15-$y$. A single BA may be sent back for the multiple links 15, preferably upon receiving a BA Request from the originator MLD 300.

Typically, the recipient MLD 350 may transmit the bitmap of several BA sessions, long after the end of the related TXOP sessions. Such implementation thus allows "Delayed Block Ack", and also supports an "Immediate Block Ack" policy if the MLD 350 is responsive enough.

The received BA frame and/or the per-link scoreboard 370-$x$, 370-$y$ (also BA frames) are used by the originator MLD 300 to manage transmit buffer 332, in particular to remove acknowledged data units (MPDUs and so the corresponding encapsulated MSDUS) therefrom based on their acknowledgment by the recipient.

At the recipient side, the received data units are reordered upon arrival at the UMAC layer 380 and then stored in the re-ordering buffer 381 in the original order. The receive reordering buffer operation is based on the Sequence Number space that is shared between the two MLD 300, 350.

Next, data units are successively provided (arrow 39) to the upper layers 260 (FIG. 2) following the original order, meaning that the preceding data unit (according to the sequence numbering) have to be yet delivered before the next correctly received data unit is delivered to the upper layers.

Therefore, through multi-link aggregation, MPDUs that belong to the same TID can be transmitted on multiple links. Even if BA agreement is established per TID, meaning that all links for a given TID have the same ACK policy, the transmission is generally independent, in terms of timing and resource allocation, from the other link to another(s). By default, all TIDs are mapped to all setup links for both UL and DL directions, a non-AP MLD can use any link within this set of enabled links to transmit frames carrying MSDUs or A-MSDUs with that TID.

Optionally, the data traffic (or part of) coming from the upper layers may be subject to a TID-to-link mapping (as referred by TID-to-link mapping modules 334, at both non-AP and AP MLDs). The TID-To-Link Mapping feature is negotiated in between MLD entities during Link setup, and intends to indicate links on which frames belonging to each TID can be exchanged. As a result, with regards to the figure, the TID-To-Link Mapping 334 is the management module in charge of piloting the access of data onto Links 320-$x$ and 320-$y$ in both UL and DL directions.

As mentioned before, the transmission on each link 15-x, 15-y may be performed according SU or MU schemes. MU schemes being more efficient, the use of MLO together with MU scheme enables to increase the peak/average throughput of the MLDs.

As defined in 802.11 network protocol, data transmissions based on MU scheme are scheduled transmissions based on the transmission needs declared by the non-AP stations to the AP, usually made using a Buffer Status Report (BSR).

With the BSR mechanism, the non-AP stations report to the AP the amount of data held in an emission buffer ready to be transmitted to the AP, i.e. the amount of buffered uplink (UL) traffic. The BSR mechanism is consequently adapted to report the amount of data held in the emission buffers corresponding to a given TID.

The information contained in the received BSRs makes it possible for the AP to schedule a MU UL transmission. This scheduling comprises selecting the non-AP stations to which MU UL transmissions are offered and to determine UL resource units to be allocated to each of the selected non-AP stations in terms of bandwidth and duration. Accordingly, each non-AP station having data to be transmitted is provided with the radio resources adapted for the transmission.

This mechanism is able to guarantee that a non-AP station, having data to transmit, gets an opportunity to proceed to the transmission of these data. Based on the knowledge of the amount of data awaiting to be transmitted at each non-AP station, the AP manages the scheduling for an efficient use of the available radio resource.

In the multi-link device context, the scheduling is made by one affiliated AP station of the AP MLD. The affiliated AP of a AP MLD performed a scheduling per link based on BSR reports containing information related to the common transmit buffer 332 common to all setup links, and common to all the types of traffics.

To meet the low latency requirements in EHT as well as to increase the efficiency of the UL MU operation, the Stream Classification Service (SCS) mechanism is proposed (and recently adapted) to be used as a light-weight mechanism for a STA to inform the AP of its QoS requirements (especially for Low-latency traffics).

Originally, SCS was proposed by 802.11aa standard and allows the establishment of streams with higher layer signaling of packet drop eligibility (e.g. allow some packets in a flow to be tagged as drop eligible) and allows classification of streams into an access category (based on TCLAS processing).

The typical scenario of using SCS consists in working with admitted traffic flow, wherein subsequently the SCS provides selection of some packets in the audio video streams for discarding when there is insufficient channel capacity.

In short, SCS aims to differentiate between separate streams within the same access category, or for a given TID, and covers the need to allow for the graceful degradation of the stream in the case of bandwidth shortage.

Recent modification of SCS is proposed in EHT standard, according to document 11-21-0340-11, in the context of multi-link.

Figure 4A:
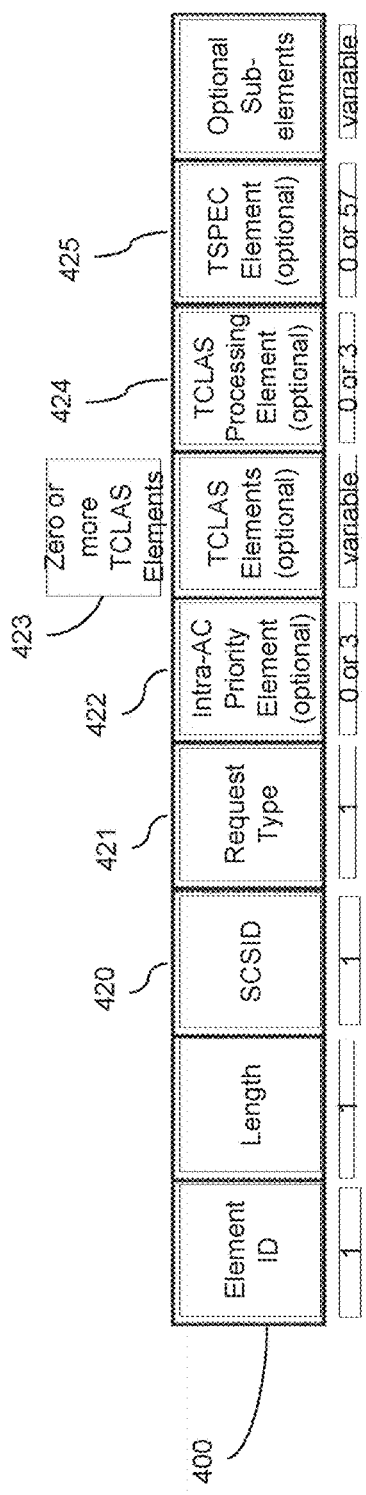
FIGS. 4a and 4b illustrate SCS mechanisms as recently modified.

The SCS descriptor (element conveyed in SCS Request and Response frames) has been modified, as reflected by 400 in FIG. 4a, so that it directly encloses a Traffic Specification (TSPEC), as a set of QoS parameters that are used to describe a TS (Traffic Stream) element in addition to the existing subfields 420 to 424. Purpose is that a non-AP EHT MLD can directly describe its traffic characteristics.

Each traffic stream is assigned an ID (SCSID, 420) by non-AP STA requesting classification (managed at MLD level).

The Request Type Element 421 is a number to identify the type of SCS request (Add/Remove/Change).

The Intra-Access Category Priority element 422 provides information from a non-AP STA to an AP on the relative priorities of traffic streams within an AC. It corresponds to the optional introduction of alternate queues (proposed by 802.11aa standard) compared to the four primary queues of EDCA.

The TCLAS Elements 423 and the Processing Element 424, if present, describe the traffic classification the non-AP STA requests the AP to apply to the corresponding stream. These elements are mandatory for downlink direction (traffic from AP MLD to non-AP MLD), but are forbidden for other directions (UL or for direct link).

The recently introduced TSPEC Element field 425 contains zero or one TSPEC element to describe the traffic characteristics and QoS expectations of traffic flows that belong to this traffic stream.

The TSPEC Element may have other names, it is called QoS Characteristics in some documents. Both names are considered equivalents in this description.

Figure 4B:
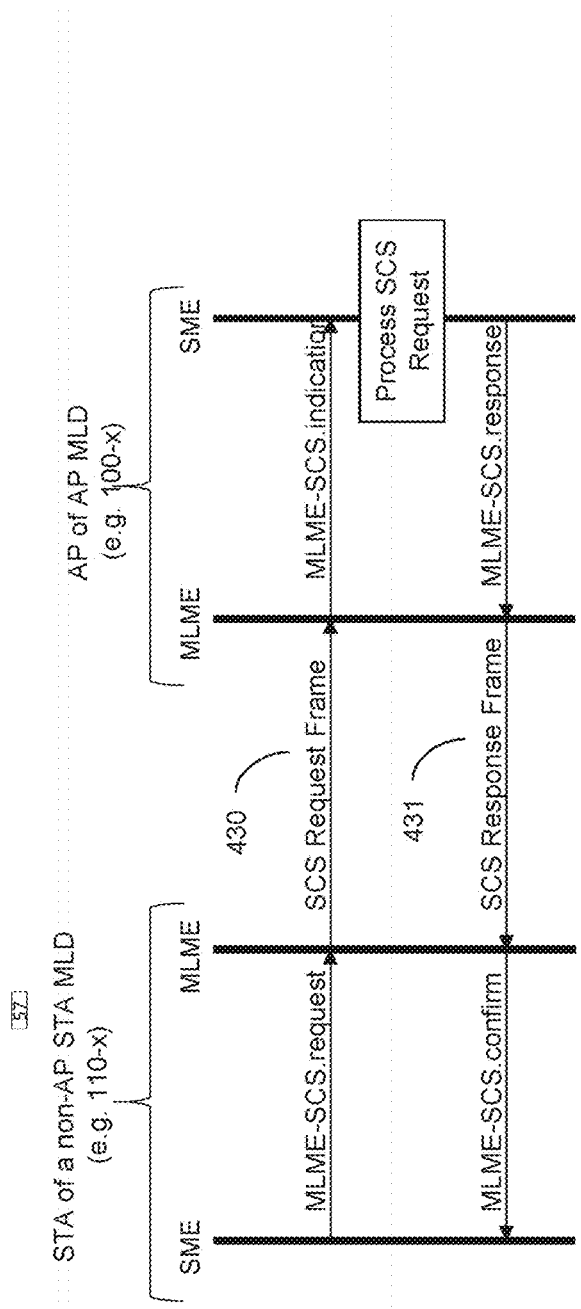

According to FIG. 4b, the recently introduced SCS mechanism remains a light-weight protocol for a STA to inform the AP of its QoS requirements. Setup of an SCS uses the MAC subLayer Management Entity (MLME) primitives (generated by the local Station Management Entity (SME) according to the 802.11 management architecture), resulting in a set of two network frames:

An SCS Request frame sent by a non-AP STA affiliated with a non-AP MLD towards the AP of an AP MLD, and that contains a TSPEC element (inside the SCS Descriptor) in which the Direction subfield is set to uplink or downlink or bidirectional link, is interpreted as a request for creation (or deletion or change according to the value of Request Type Element 421) of a traffic stream that applies at the MLD level for low latency traffic.

Upon receipt of an SCS Request frame from an associated non-AP STA, the AP shall respond with a corresponding SCS Response frame.

However, the recently amended SCS mechanism is still deficient to handle latency sensitive streams.

First, the SCS mechanism aims to specify characteristics of stream(s) within an AC, but this specification for traffic transmission cannot be relevant for all data of a given AC. One may note that a single STA can support more than one traffic (local applications) for a given traffic type (that means several traffic flows, LL or not, can be filled in a same AC queue).

Secondly, this proposal is focused on DL traffic and does not address devices that are latency sensitive data producers (e.g. Head Mounted Display). In SCS, the AP classifies incoming individually addressed MSDUs from the Distribution System (generally the Internet) based upon parameters provided by the non-AP STA. For uplink traffic (content generated by a non-AP STA), no TCLASS is allowed to be specified: thus the AP has no information useful for scheduling latency sensitive data pending in non-AP STA's transmit buffer (AC). It seems that a traffic specification is provided, but no medium access means is setup for accurate transportation.

Thirdly, while amended in the scope of 802.11be/EHT standard that introduces the usage of multiple links, the SCS mechanism as proposed in the art was not offering any guarantee regarding the latency, reliability or jitter of the transmission over multiple links.

Low latency reliable services, LLRS, are services provided to a higher layer traffic stream that prioritize and deliver MSDUs (data units of this traffic stream) within a worst-case latency budget with a given reliability/packet delivery ratio (PDR) and low jitter. Traffic that may be concerned by LLRS includes latency sensitive data, i.e. data from applications such as gaming, media streaming, augmented reality, virtual reality, and so on.

Thus, the AP MLD, which only considers the competition between the stations, gives an uplink transmission opportunity to the station with no consideration to the different available links.

Therefore, there exists a need to improve the MU UL transmissions in the MLD context, particularly in order to improve transmission reliability for uplink traffics while ensuring low latency.

The present invention seeks to improve the scheduling of the wireless resources for multi-user transmission in the context of MLOs that is emerging for 802.11be standard.

Indeed, the non-AP MLD is well aware of its traffic resources needs such that, knowing that some radio links are experiencing disturbances or have limitations in bandwidth, the non-AP MLD is in a better position to determine the optimal link for data transmission at a given time. Typically, the non-AP MLD may target to use one link for part of a traffic stream (e.g. reliability) whereas other parts of the traffic stream may be less essential.

According to a first aspect, the invention proposes to use a specific Stream Classification service adapted to multi-link devices, based on the legacy SCS but adapted as a multi-link SCS (ML-SCS), enabling each non-AP MLD to report for all traffic streams or for given traffic streams, the specification of data awaiting to be transmitted together with a link, identified by the non-AP MLD, on which the non-AP MLD expects to be scheduled for transmission.

Receiving such ML-SCS description, the AP MLD is then in possession of an additional information, regarding the link considered by the non-AP, as being the more adapted for a subsequent scheduling for an UL transmission, either in SU or MU mode (FIG. 7) or in a restricted period (FIG. 8).

Indeed, the AP MLD schedules the non-AP MLD taking into consideration both the competition between the stations but also the link chosen by the non-AP according to the LL traffic specification.

Therefore, the core of the invention aims at enabling the non-AP MLD to provide along with traffic specification reported by station (in a ML-SCS Descriptor as further disclosed), an associated indication about a link over which the station expects to be scheduled by the AP according to the corresponding traffic specification. By allowing an MLD to specify the most efficient link for the transmission of low latency traffic, the chances to have the low latency traffic streams respecting the low latency constraints are improved.

Embodiments of the invention generally apply to any MLD, non-AP or AP, for which resources are to be scheduled by an AP MLD. The MLD (which may also be referred to as a scheduled MLD) may then provide information about its traffic specification needs and link constraints to the scheduling station according to embodiments of the invention.

For example, in the case of P2P links established between MLDs of a P2P group of stations, a coordinator station (e.g. Group Owner, or a device acting as software AP according to Wi-Fi Direct protocol), acting as a scheduling station for the P2P group, has to know the real-time information of other stations of the group.

Figure 5:
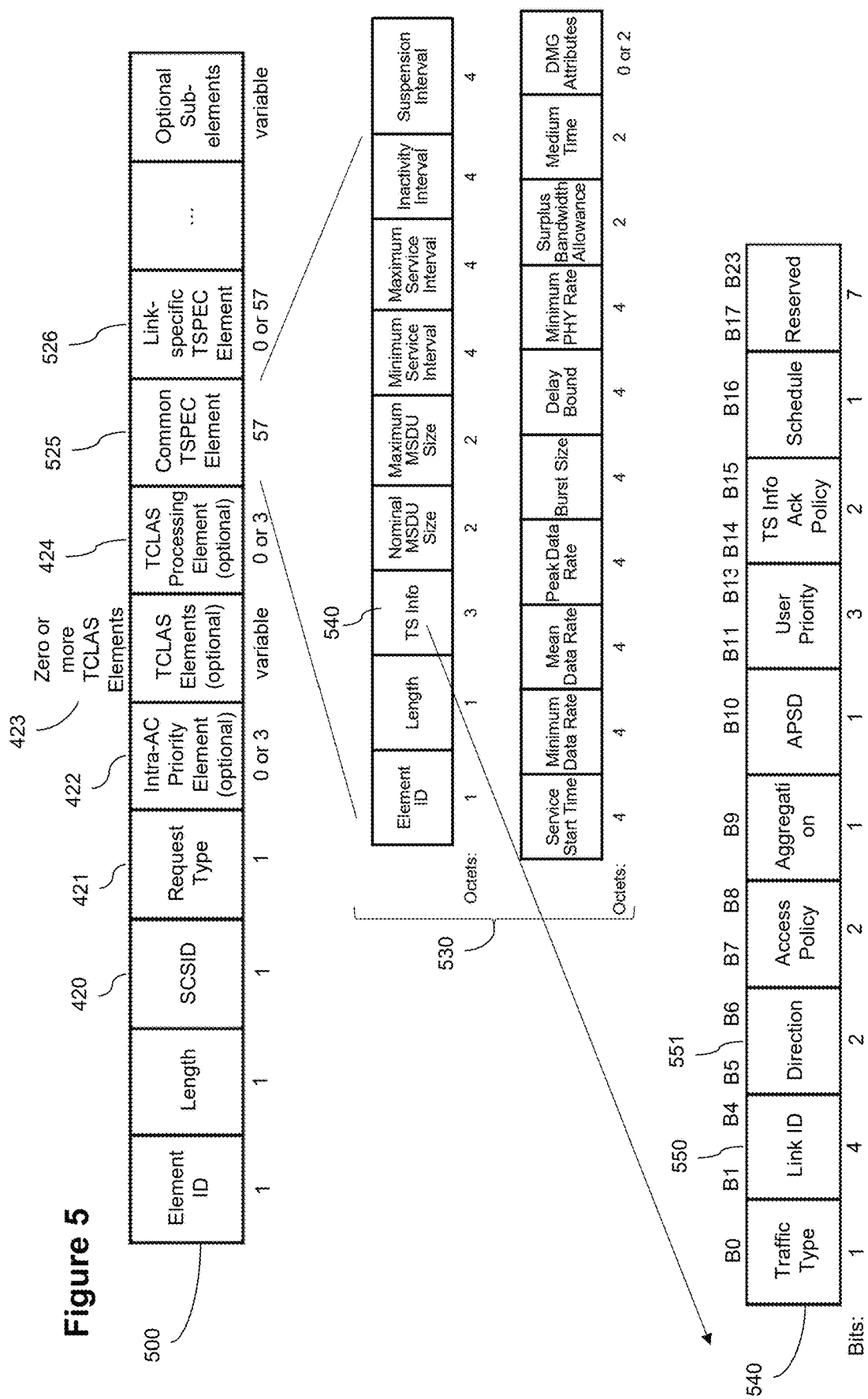
FIG. 5 illustrates a modified SCS Descriptor that may be used in a ML SCS service according to embodiments of the invention.

FIG. 5 illustrates a modified SCS Descriptor that may be used in a ML SCS service according to embodiments of the invention. The principle is to insert a Link_ID inside the descriptor, typically as a replacement of TSID field in the TSPEC as this field is no longer used. Different alternative embodiments are described through FIGS. 6a to 6b.

As previously explained, the traffic specification is described through TSPEC Elements (each headed by a TS Info field 540), but any other similar information element can be envisaged (like QoS Characteristic elements, headed with a Control Info field).

The proposed format 500 is an adaptation of format 400 with one or more TSPEC subfields included, each TSPEC being related to the traffic specification above a given link established between the non-AP STA MLD requester and its AP MLD.

In some embodiments, the TSPEC 525 (and 526 if any) follows the legacy 802.11 TSPEC element format (530) of 57 bytes length.

The TSPEC element 530 contains the set of parameters defining the characteristics and QoS expectations of a LL traffic flow, in the context of a particular STA of the invention. Unless indicated otherwise, fields that follow the TS Info field are set to 0 for any unspecified parameter values. A STA sets any parameters to unspecified if it has no information for setting that parameter.

The structure of the TS Info field is redefined. As the legacy TSID subfield (originally at position 550) contains a TSID value when the TSPEC element is included within an ADDTS Response frame, this subfield has no longer meaning in a SCS (or ML-SCS) Descriptor. This is why invention intends to refurbish this subfield in the scope of informing of a link to be used for the LL traffic specification. The subfield 550 embeds now a Link ID, still 4-bit long. Accordingly, one TSPEC is associated with one link.

Of course, there could have location alternatives for the Link ID information, as example inside the Reserved bits B17 to B23.

The Link ID subfield 550 specifies a value that uniquely identifies the link for which the STA is reporting a traffic specification.

Preferably, the Link ID subfield 550 is set to 15 if the reported amount of data is global and no part is requested to be transmitted on a given Link, or if the reporting device does not have that information. This provides compatibility with SCS descriptor, where TSID has no meaning.

The Link ID is a current information for the AP, which provides simply and efficiently information for scheduling next communication slots for the indicated Link. It shall be noted that the link may also be identified using the "AP ID" in place of "Link ID".

Indeed, the term "link" is often used for designating an entity that connect two endpoints, an affiliated station of the non-AP MLD and an affiliated AP of the MLD. From that perspective, in some embodiments, an affiliated AP can terminate several links, such that the AP ID is more appropriate as the Link ID. Following embodiments are described hereinafter with reference to the Link ID.

Among subfields in the TS Info 540, the Direction subfield 551 specifies the direction of data carried by the specified stream (either uplink, downlink or Bidirectional link (equivalent to a downlink request plus an uplink request, each direction having the same parameters). Other subfields (Access Policy subfield, Aggregation subfield, APSD subfield, UP subfield, TS Info Ack Policy, Schedule subfield) are of less importance in the context of SCS and can be set as reserved.

In some embodiments, several TSPECs 525, 526, etc. specify a traffic specification each one with regard to a dedicated link, as provided for specification by the non-AP STA. Therefore, the Link ID 550 of the TS Info subfield of each TSPEC is different from the latter one(s). Of course, when the fields in the TSPEC element specify resources for a single direction (not bidirectional), therefore there could have double specified TSPEC resources with a same Link ID to support both stream directions.

As disclosed in the figure, a TSPEC with a Link ID set to 15 is called a Common TSPEC, common to all links, and is followed by other TSPEC 526 that refines the specification for individual links. The Direction subfield 551 is reserved in that case.

As example, Nominal MSDU size and Maximum MSDU size value are common to a given LL traffic stream, therefore this information could appear in Common TSPEC subfield 525. In contrary, the Minimum Service Interval and the Maximum Service Interval fields could be specific per link, so they would appear as significant in Link-specific TSPEC element 526.

For fields that follow the TS Info field, when a Link-specific TSPEC element is present in the ML-SCS, the non-AP STA shall specify all parameter values that are specific to this Link. If any of the parameters have unspecified values in a Link-specific TSPEC element, the corresponding values are the parameter values of the Common TSPEC Element 525 (inheritance).

In a preferred embodiment, the non-AP STA sets at least the Minimum Service Interval and the Maximum Service Interval fields in any Link-specific TSPEC element transmitted in an ML-SCS Descriptor element (or at least in the Common TSPEC if no Link-specific is present). These indications are related to the minimum and maximum interval respectively, in microseconds, in which it requests to be scheduled for UL traffic (if the Direction subfield in the TSPEC element is equal to 0) or Direct link traffic (if the Direction subfield in the TSPEC element is equal to 1).

When the non-AP station informs of a traffic specification for DL traffic (if the Direction subfield in the TSPEC element is equal to 2), the link ID field 550 may be for recommendation only: as the transmitter of DL data is the AP MLD, it still decides by its own the better link for transmitting.

Besides, the format 500 comprises an indication relating to the overall links on which the station expects to be scheduled by the AP MLD. The non-AP MLD, i.e. the affiliated stations, being aware of the traffic to be delivered on the links, provides within the ML-SCS Descriptor through the set of TSPEC elements (525 and 526) the indication of the links to be considered for conveying the traffic stream as referred to the SCSID of present ML-SCS.

In a preferred embodiment, the list of links, resulting from the TS Info Element of each TSPEC 525 and 526, fits into TID-to-Link mapping. It is recalled that the TID-To-Link Mapping feature is negotiated in between MLD entities during Link setup, and intends to indicate links on which frames belonging to each TID can be exchanged. As the SCS Descriptor refines the classification of a LL stream that already corresponds to a TID (in other words, the LL stream is a sub-part of data content of a TID and stored in the non-AP STA MLD transmit buffer), it is envisaged that those links adapted to transport the LL stream (identified by SCSID) form a subset of the Links identified by TID-to-Link mapping for this TID.

One may note that the usage of ML-SCS Descriptor format can be broaden to numerous implementation specific algorithms for network resource allocation over multiple links.

Figure 6A:
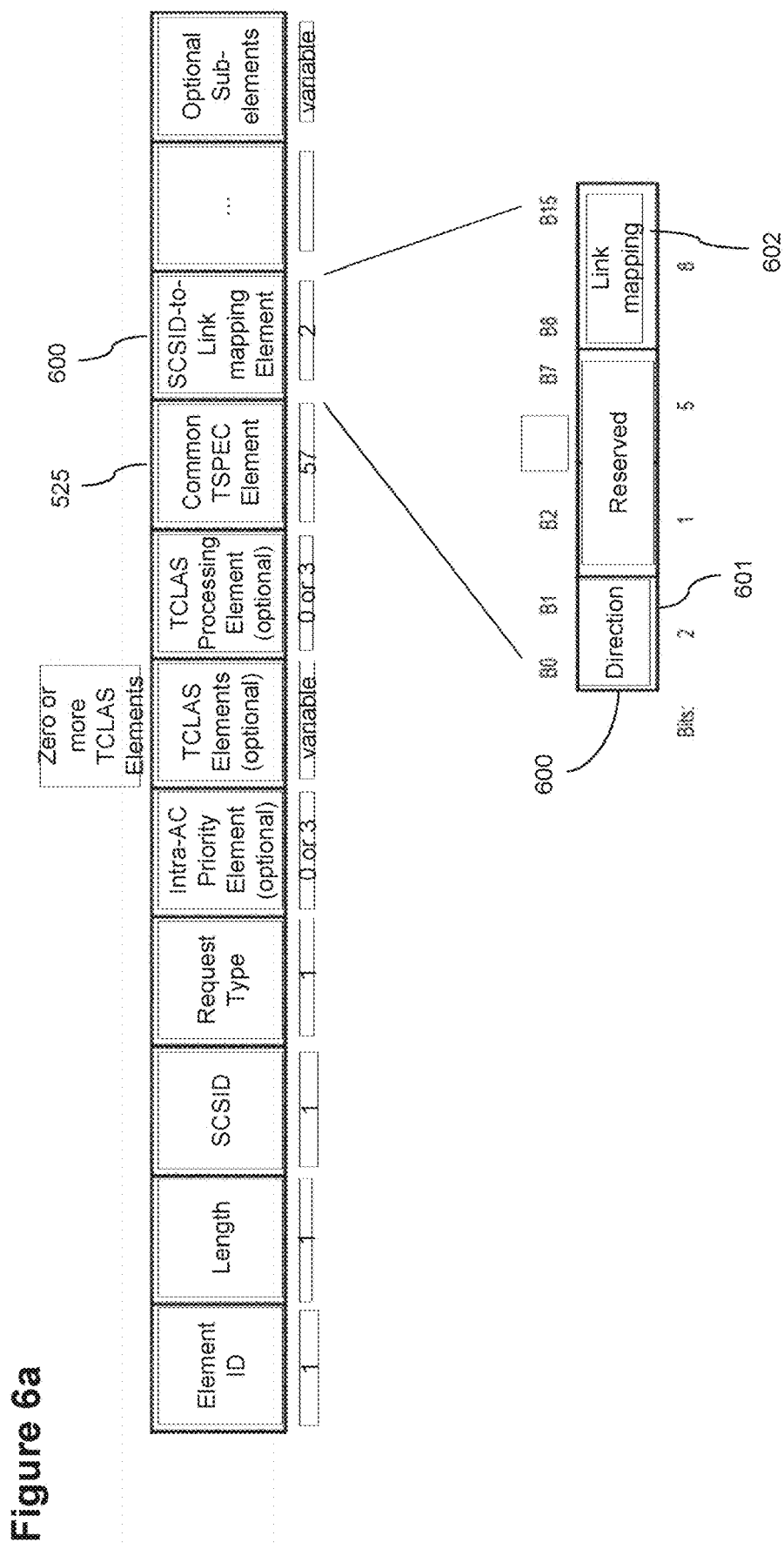
FIG. 6a illustrates a SCS descriptor according to embodiments of the invention.
Figure 6B:
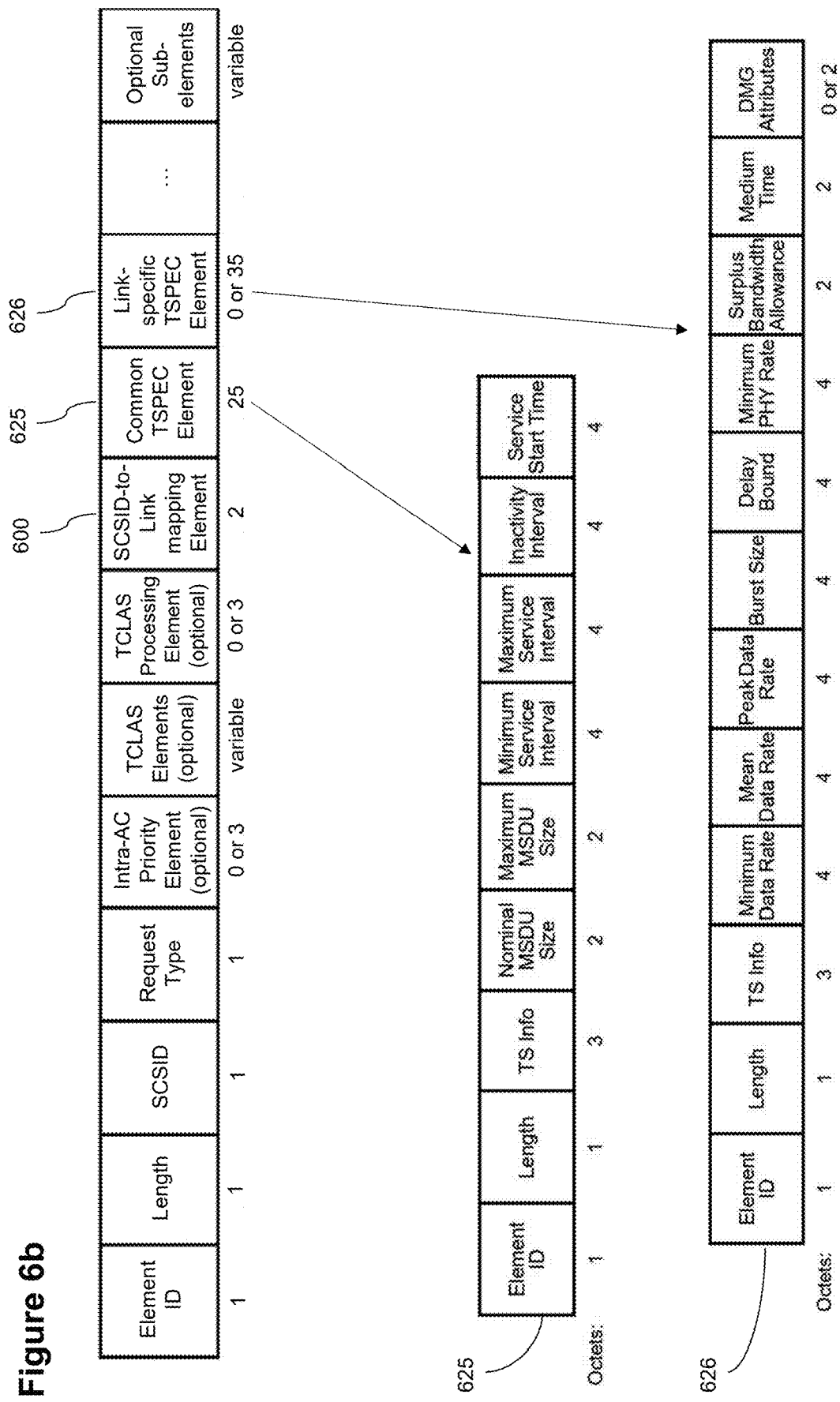
FIG. 6b illustrates a SCS descriptor according to other embodiments of the invention.

Now, several example of ML-SCS are described in relation to FIGS. 6a and 6b.

Indeed, still according to the first aspect of the invention, a frame comprising a ML-SCS format (430 or 431) as described hereinbefore is provided.

FIG. 6a introduces the usage of a new element, namely SCSID-to-Link mapping element 600.

According to an aspect, it is proposed to use a specific Stream Classification service adapted to multi-link devices, ML-SCS, enabling each non-AP MLD to negotiate with its AP MLD the set of links on which the non-AP MLD expects to be scheduled for transmission.

Thus, an SCSID-To-Link Mapping element 600 indicates links on which frames belonging to each traffic stream identified by its SCSID can be exchanged.

The Direction subfield 601 is set to 0 (Uplink) if the SCSID-To-link Mapping element provides the SCSID-to-link mapping information for frames transmitted on the uplink. It is set to 1 (Downlink) if the SCSID-To-Link Mapping element provides the SCSID-to-link mapping information for frames transmitted on the downlink. It set to 2 (Bidirectional link) if the SCSID-To-Link Mapping element provides the SCSID-to-link mapping information for frames transmitted both on the downlink and the uplink. The value of 3 is reserved.

The 'Link Mapping of SCSID' field 602 for current SCS Descriptor indicates the link(s) on which frames belonging to the SCSID are allowed to be transmitted. A value of 1 in bit position i of the Link Mapping field indicates that the SCSID is mapped to the link associated with the link ID i for the direction as specified in the Direction subfield.

Therefore, both the Direction field value and the 'Link Mapping of SCSID' field value indicate the maximum number of TSPEC that could be listed in the SCS Descriptor.

If not all TSPEC elements are listed in the SCS Descriptor compared to the determined maximum number of elements, then the missing TSPEC element indicates that no requirement is needed (in other words, the transportation for LL traffic on a given link for a given direction is unspecified).

In some embodiments as the example displayed with FIG. 6b, the TSPEC 525 (and 526 if any) have a format reduced in size, also called as TPSEC-Lite.

The Common TSPEC Element 625 contains the set of parameters that defines the characteristics of the flow (MSDU size etc.).

The Link-Specific TSPEC Element 626 contains the set of parameters that defines the characteristics for transportation of the flow onto a given link as indicated by the SCSID-to-Link mapping element 600.

One may note that the ML-SCS format can be broaden to numerous implementation specific algorithms for network resource allocation over multiple links.

According to some embodiments, a non-AP MLD, scheduled station, delivers multi-link SCS Descriptor to assist the AP MLD, scheduling station, in allocating UL MU resources or in allocating a link for the UL transmission.

Figure 7A:
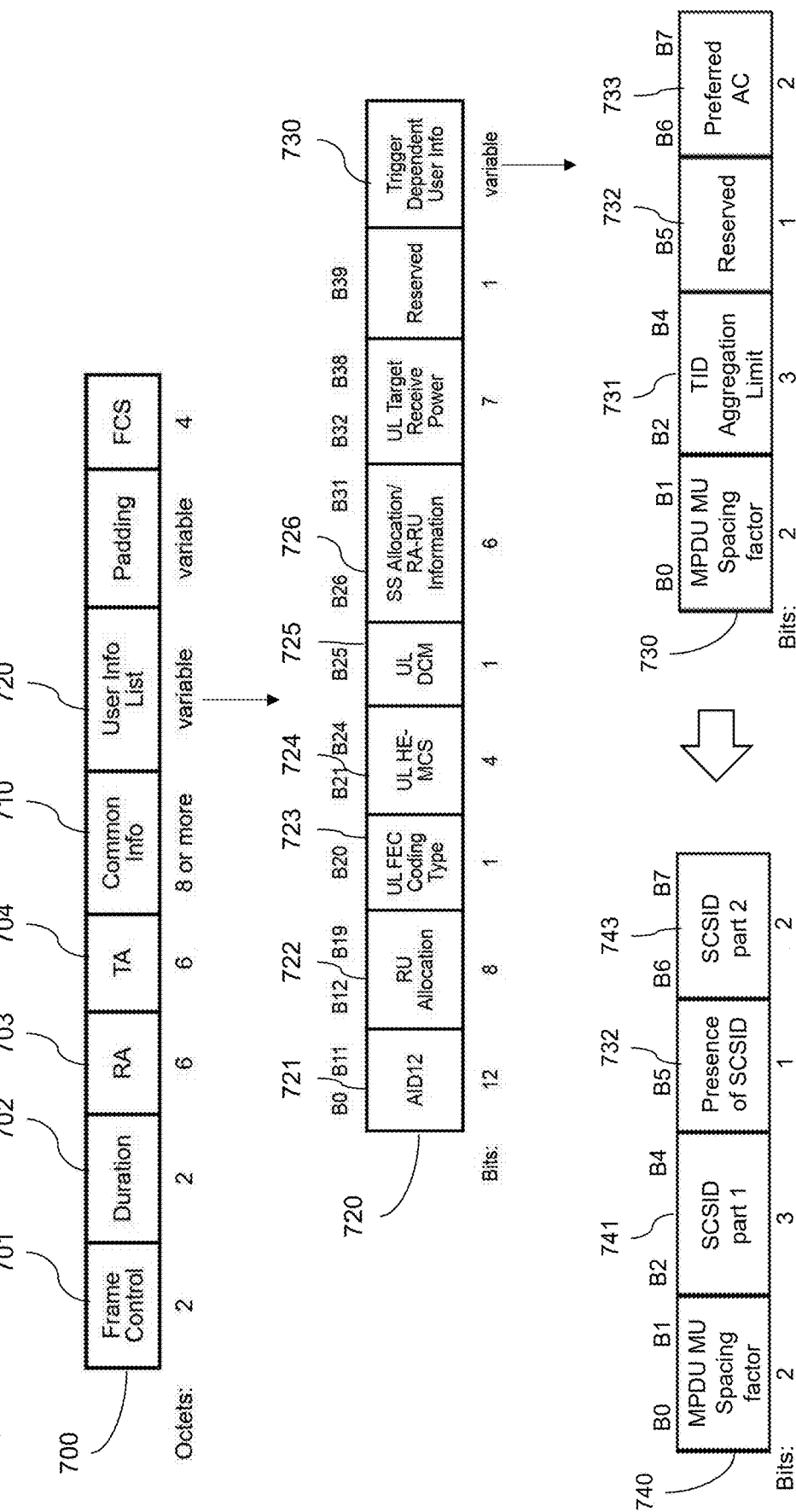
FIG. 7a illustrates the MAC format of the trigger frame according to an embodiment of the invention.

The resulting Trigger frame, issued by an AP of an AP MLD, is presently disclosed in relation with FIG. 7a.

FIG. 7a illustrates the MAC format of the trigger frame 330 according to the 802.11ax standard and adapted according to an embodiment of the invention. It illustrates the use of the SCSID in the UL MU operation. This adapted trigger frame for low latency traffic streams may be used for triggering target wake time periods as will be described in relation with FIG. 8.

The Trigger frame is used to allocate (random and/or scheduled) resource units for UL MU transmission on a link by STA of non-AP STA MLDs. The trigger frame is duplicated in each 20 MHz of the targeted composite channel (or link) to reserve a transmission opportunity over the composite channel. The trigger frame follows the legacy format of control frames (no specific HT preamble).

The TF 700 is made up of a MAC header and of additional fields. The MAC header includes the following fields common to all control frames: a frame control field 701, a duration field 702, a RA (Receiver Address) field 703, a TA (Transmitter Address) field 704. The additional fields, specific to the trigger frame, include a data portion formed of information fields (710 and 720), and a CRC/FCS (Cyclic Redundancy Check, or Frame Check Sequence, or also called checksum) field. The CRC/FCS field may optionally be preceded by a padding field of variable size, for considerations out of scope of the present invention.

The Duration field 702 is set to the estimated time, in microseconds, required for the pending uplink transmissions, and is used to set the NAV of nodes not targeted by the RA field 703. This Duration field 702 thus sets the expected duration for the solicited transmission opportunity TXOP.

The RA field 703 is set to the address of the recipient stations. As a Trigger frame is intended for a group of station devices (within a BSS on the link where it is sent), the wildcard MAC address (FF:FF:FF:FF:FF:FF) may be used as a broadcast indication.

The TA field 704 is set to the MAC address of the affiliated AP of the AP MLD transmitting the Trigger frame. When the AP hosts several virtual APs for multiple BSSs, the MAC address of the current BSS (i.e. the specific BSSID or MAC address of the virtual AP concerned) is used for the TA field 704.

The User Info field 720 forming part of the additional fields in the TF 700 is now illustrated.

The User Info field 720 defines the allocation of one or more resource units to nodes of the BSS addressed in TA field 704. A plurality of User Info fields 720 is usually used to define the allocation of all the resource units of the transmission opportunity.

User Identifier subfield 721, also known as AID12 subfield 721, contains the 12 LSBs of the Association IDentifier (AID) of the station(s) to which the RU identified in RU Allocation field 722 is allocated, to transmit the MPDU(s) in the uplink direction. The AID is a 16-bit unique value assigned the non-AP MLD, that is common value to all affiliated STAs of the non-AP MLD and that was assigned by the AP MLD during association handshake, i.e. during registration.

RU Allocation subfield 722 indicates the RU or RUs that are allocated to the one or more stations identified in AID12 subfield 721.

The other fields of User Info field 720 are of less importance for the present invention.

The User Info field 720 is illustrated according to the HE format provided by the 802.11ax standard (802.11ax standard introduces the specification of High Efficiency station, or HE station). The EHT format envisaged by the 802.11be standard provides a variation for usage of bits B25 and B39, which are of no importance for the present invention.

One specific field of importance for the present invention is the Trigger Dependent User Info 730, which follows common format for HE and EHT.

The Trigger Dependent User Info 730 is one octet length and is present in a Basic variant Trigger frame (that is to say the TF which triggers Triggered-Based data, TB PPDU).

The MPDU MU Spacing Factor subfield is of no importance for the present invention. According to HE and EHT formats, the TID Aggregation Limit subfield 731 indicates the MPDUs allowed in an A-MPDU carried in the TB PPDU and the maximum number of TIDs that can be aggregated by the STA in the Aggregated-MPDU (A-MPDU). The Preferred AC subfield 733 indicates the lowest AC that is recommended for aggregation of MPDUs in the A-MPDU contained in the HE TB PPDU sent as a response to the Trigger frame.

According to some embodiments of the invention, the Trigger Dependent User Info takes the format 740 when the bit B5 (732) is no longer Reserved, that is to say when value of B5 is '1'. This intends to indicate that a stream classification service identifier (SCSID) information is provided instead of a TID information. As a result, the 'SCSID part 1' field 741 and 'SCSID part 2' field 743 replace respectively fields 731 and 732, in order to obtain an SCSID value formed of 5 bits. In option, only one of the fields 741 or 743 could be used as there will be not so numerous SCSID values per station and the value could be coded onto 2 or 3 bits.

The obtained SCSID is set to a nonzero value chosen by the non-AP STA identifying the SCS stream that was specified in the ML-SCS Descriptor element. The SCSID indicates the LL stream that is recommended for aggregation of MPDUs in the A-MPDU contained in the HE TB PPDU sent as a response to the Trigger frame. The SCSID field(s) is(are) set to the value of the SCSID field in the ML-SCS Descriptor element received in the SCS Request frame 430.

The format herein proposed is for illustration only, any other combination of Presence Bit 732 and/or variant for coding the SCSID value (preferably per User Info field) could be envisaged inside a Trigger frame format.

This adapted trigger frame allows the AP MLD to allocate resources specific for one or more traffic stream. This allocation is made based on the received preferences from the non-AP MLD for the mapping of traffic stream to link.

Figure 7B:
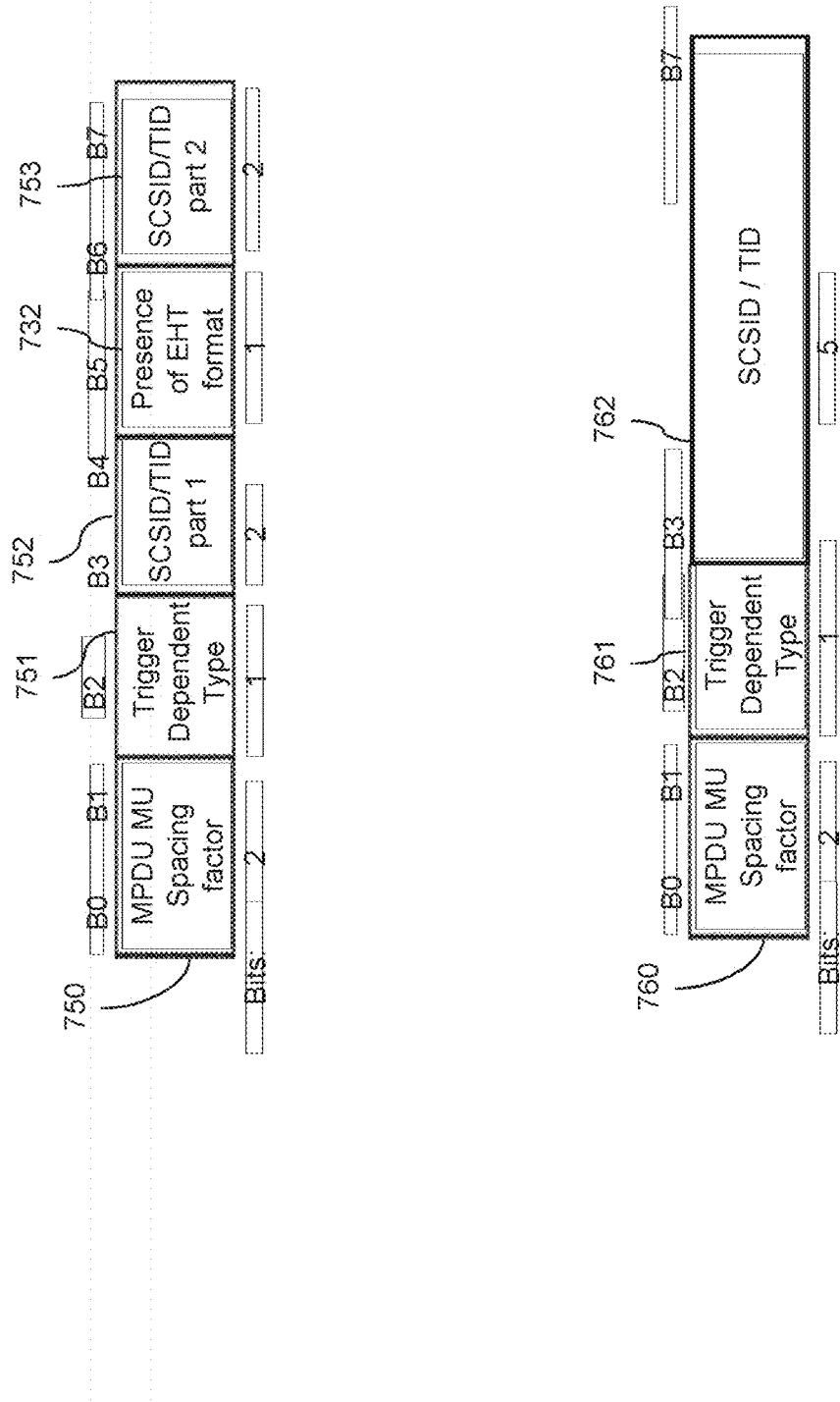
FIG. 7b illustrates a second MAC format of the trigger frame, alternative to the format of FIG. 7a, according to an embodiment of the invention.

FIG. 7b illustrates a second MAC format of the trigger frame 330 according to the 802.11ax standard and adapted according to an embodiment of the invention. It illustrates both the use of the SCSID and the used of TID in the UL MU operation.

As previously described, SCSID-based low latency traffic differentiation mechanism offers the best efficiency and finer granularity for latency sensitive traffics. Nevertheless, this implies additional behavior for the station to finely separate low latency data against normal data, so that only selected low latency data are to be sent over triggered mechanism or reserved service periods (as addressed by FIG. 8). Selection of a sub-part of data going through a TID may impact device implementations, namely for the management of sequence numbers (as some MSDUs will take precedence in transportation). In other words, SCSID-based low latency traffic differentiation as provided by the invention may be contemplated by high-end station device, whereas low-end devices may be limited to consider TID-based low latency traffic differentiation (less efficient, triggering a TID means low-latency data inside a TID may be emitted along with everything within this TID).

Present embodiment intends to address both high-end and low-end station devices.

Therefore, FIG. 7b provides MAC formats of the trigger frame adapted to indicate which differentiation mechanism is requested by the AP (TID or SCSID).

A User Info field that is addressed to a non-AP STA is either an HE variant or an EHT variant.

Basically, only the "Trigger Dependent User Info" field is modified:

Format 750 is a "Trigger Dependent User Info" compliant with HE stations (as did 740), also called HE variant format. One may note that even if low latency services are reserved to EHT stations (unknown by HE devices), the format used to trigger such an EHT station of the invention can follow the HE (802.11ax) format (therefore TB PPDU is HE TB PPDU)

Format 760 illustrates a possible modification for an EHT "Trigger Dependent User Info" field, that could be called EHT variant, therefore restricted to EHT stations (that is to say that this format is used when User Info field 720 is addressed to an EHT STA and the TB PPDU format follows EHT TB PPDU format). The illustration of 760 provides compliancy in size with the HE variant, but this could be modified in case that the limitation of having all User Info fields in the User Info List field of a Trigger frame with same length is inhibited.

Back to HE variant (format 750), the Trigger Dependent User Info field in a Trigger frame is interpreted differently by HE devices and EHT devices. An EHT STA according to the invention interprets the Trigger Dependent User Info field as EHT variant if B5 in the Trigger Dependent User Info field is equal to 1; and then interprets the requested differentiation mechanism according to the Trigger Dependent Type subfield 751 (B2).

For example, the Trigger Dependent Type subfield 751 identifies the encoding of the HE Trigger Dependent User Info field variant:

| Trigger Dependent Type Subfield value | EHT Trigger Dependent Type variant |
|---|---|
| 0 | SCSID/TID subfields (part 1 and part 2) represent a TID value |
| 1 | SCSID/TID subfields (part 1 and part 2) represent an SCSID value |

Back to EHT variant (format 760), the Trigger Dependent User Info field in a Trigger frame is directly interpreted as an EHT format, as only EHT devices can receive such kind of information. Therefore, there is no longer need of a retro compatibility format (as 730/730 with B5). As a result, the subfield containing SCSID/TID information could be larger so that more SCSID values can be addressed in the 5-bit range. Concerning TID coding, the B3 is Reserved (0) as the TID remains coded with 4 bits.

For example, the Trigger Dependent Type subfield 761 identifies the encoding of the EHT Trigger Dependent User Info field variant:

| Trigger Dependent Type Subfield value | EHT Trigger Dependent Type variant |
|---|---|
| 0 | SCSID/TID subfield (B4 to B7) represents a TID value |
| 1 | SCSID/TID subfield (B3 to B7) represents an SCSID value |

Figures 8A, 8B:
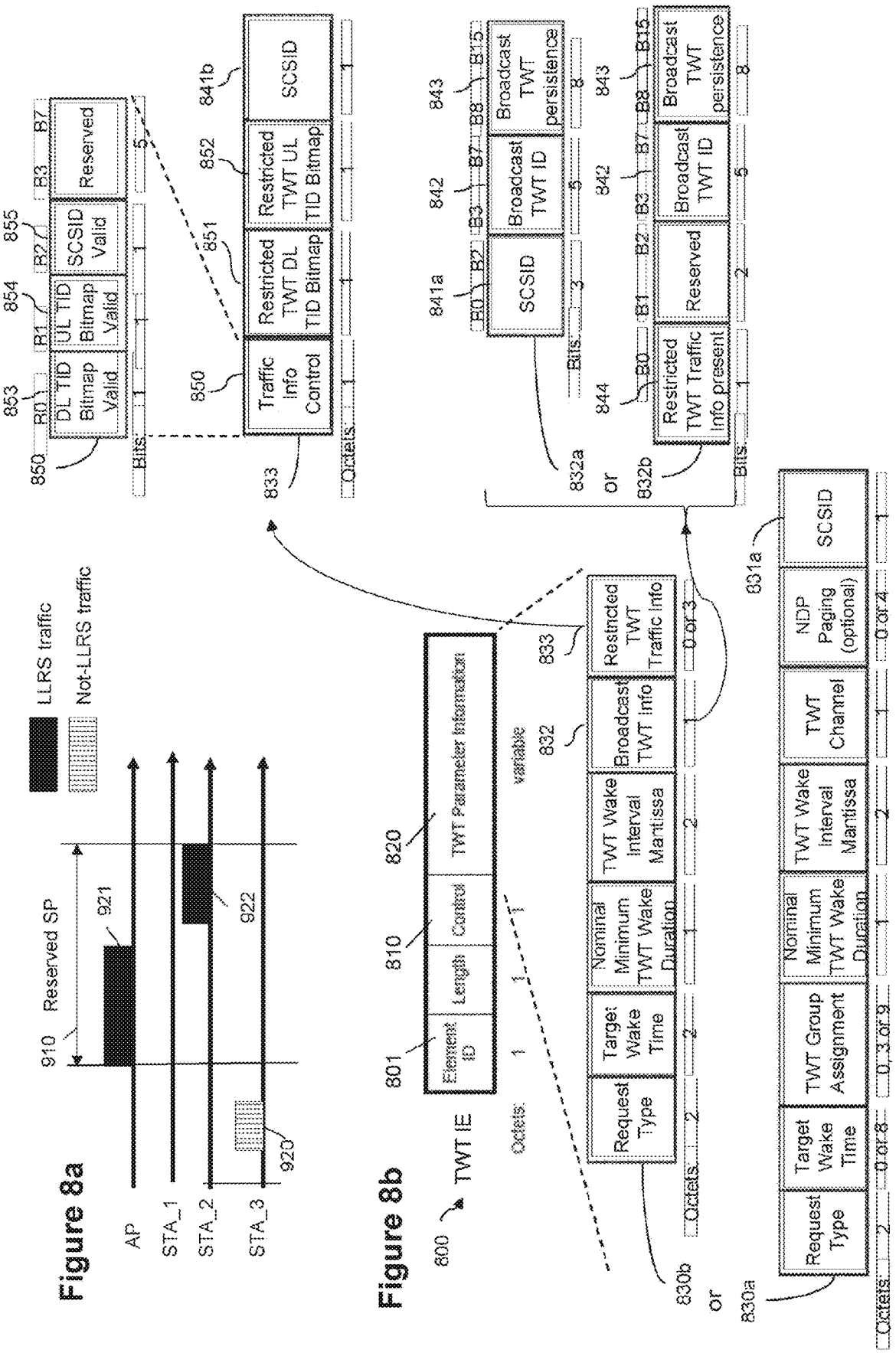
FIG. 8a illustrates the reservation of a service period for low latency traffic streams according to embodiments of the invention.
FIG. 8b illustrates a format of a TWT IE according to embodiments of the invention.

To prioritize LLRS traffic over non-LLRS traffic within a BSS, a service period (SP) may be reserved for LLRS traffic (also referred to as LL SP). FIG. 8a illustrates the reservation of a service period for low latency traffic streams according to embodiments of the invention. Accordingly, it offers the possibility to prioritize LLRS traffic over non-LLRS traffic within a BSS.

In the illustration, the affiliated AP of an AP MLD schedules a reserved service period 910 on one link. The AP may announce the starting time and the ending time of the period. The reserved service period 910 may be fully dedicated to LLRS traffic exchange, or in variant may allow both LLRS traffic and non-LLRS traffic. In the figure, it is a reserved LLRS period.

The AP participates to the LLRS traffic exchange (sends 921 to non-AP station and then receives 922 from non-AP station) in the reserved service period. However, this is not mandatory. The reserved LLRS period may alternatively be used by non-AP stations to directly exchange P2P LLRS traffic.

For illustration of SU communications, previously to the reserved service period, non-AP station STA_3 gains access to the wireless medium and may start transmitting non-LLRS traffic 920. AP can next transmit LLRS traffic 921 to non-AP station STA_1 and then receives other LLRS traffic 922 from non-AP station STA_2.

Preferably, the communications 921 and 922 are MU communications, wherein the MU communication 921 includes a TF issued by the AP and that aims to triggers MU communication 922.

However, measures need to be applied to guarantee that the service period is restricted for LLRS traffic transmission.

In embodiments of the invention, the reserved service period is a protected Target Wake Time (TWT) service period (referred to as TWT SP or LL TWT SP).

Target Wake Time enables devices to determine when and how frequently they will wake up to send or receive data. TWT allows an AP to manage activity in the network, in order to minimize medium contention between STAs, and to reduce the required amount of time that a STA in the power-save mode on a Link needs to be awake. Thanks to this mechanism, a STA of an non-AP STA MLD can doze except during the TWT service period (SP) intervals setup on this link.

TWT SPs can be either individually agreed or broadcast. An individual TWT SP is a specific time or set of times negotiated between an AP and a STA (one being referred to as TWT requesting station and the other as TWT responding station) and at which the STA is expected to be awake in order to exchange frames with the AP. During negotiations, they transmit to each other a special information element (TWT IE) which contains TWT parameters and can be interpreted as a request, suggestion, demand, alternation, acceptation, dictation, or rejection. Either the AP or the STA can tear down the TWT by transmitting a TWT Teardown frame. The broadcast TWT is similar to an individual TWT except that the specific time or set of times are not negotiated between stations but directly broadcast by an AP to multiple non-AP stations, e.g. using a beacon frame. In that case, the AP uses another mechanism based on a Traffic Indication Map (TIM) element to indicate the set of STAs towards which the AP is going to transmit (Downlink data-DL) or which the AP is going to trigger for uplink traffic. If a STA is not indicated in a TIM element, it means that it will not be solicited within the next TWT SP.

FIG. 8b illustrates a format of a TWT IE adapted to be associated with the ML-SCS service according to embodiments of the invention.

The TWT IE 800 is identified by an Element ID 801 and comprises a field 820 for transporting TWT parameter information. The "Control" field 810 (not illustrated) allows informing through a "Negotiation Type" field whether the TWT is a broadcast TWT or an individual TWT agreement.

The TWT Parameter Information field 820 contains a single Individual TWT Parameter Set field with format 830*a* if individual TWT and one or more Broadcast TWT Parameter Set fields with format 830*b* if the Broadcast TWT.
Individual TWT.

According to the invention, an SCSID subfield 831*a* is provided in Individual TWT Parameter Set field 830*a*.

The SCSID field 831*a* is set to a nonzero value chosen by the non-AP STA identifying the SCS stream that is specified in the ML-SCS Descriptor element. The SCSID indicates the LL stream that is negotiated (or under negotiation) for transportation within the present TWT IE. The SCSID field is set to the value of the SCSID field in the ML-SCS Descriptor element received in a previously exchanged SCS Request frame 430.

Thus the individual TWT is easily restricted to LL traffic stream identified by the SCSID value. The reserved SP 910 applies to a restricted individual TWT that is setup for LL stream as identified by the SCSID value.

Further advantage of informing the SCSID is also that it avoids providing any Link ID Bitmap inside the TWT IE, as this information was already provided by the ML-SCS Descriptor.
Broadcast TWT.

According to the invention, an SCSID information is provided for broadcast TWT, so that the reserved SP 910 applies to a restricted broadcast TWT that is setup for LL stream as identified by the SCSID value.

In one embodiment, the SCSID is directly located inside the 'Broadcast TWT Info' field 832, that defines the set of TWT parameters. Typically, the first 3 bits which are reserved according to 802.11be D1.0 can be used to support this field (841).

Each broadcast TWT info field is identified by a "Broadcast TWT ID" field 842 allowing an AP to schedule multiple sets of broadcast TWT SPs with different sets of TWT parameters. The Broadcast TWT ID 842 thus indicates a specific Broadcast TWT for which the transmitting STA is providing TWT parameters. The Broadcast TWT Persistence subfield indicates the number of Target Beacon Transmission Times (TBTT) during which the Broadcast TWT SPs corresponding to this broadcast TWT Parameter set are present. The Broadcast TWT Persistence subfield plus 1 except that the value 255 indicates that the Broadcast TWT SPs are present until the SCS stream is explicitly terminated (e.g. ML-SCS Request or Response frame with Request Type Element 421 with the Remove indication).

The SCSID field 841 is set to the value of the SCSID field in the SCS Descriptor element received in the ML-SCS Request frame.

Note that Broadcast TWT ID value can be assigned to several non-AP STAs, so that several STAs are scheduled in a TWT LL SP, each for its specific SCSID SCS stream.

In one alternative embodiment, the SCSID is located inside a further field 833 following the 'Broadcast TWT Info' field 832.

The Restricted TWT Traffic Info field 833 is present when the Restricted TWT Traffic Info Present subfield 844 is set to 1. This value is mandatory when the broadcast TWT is related to an SCS LL stream (otherwise, the Traffic Info is related to TIDs).

The Restricted TWT Traffic Info field 833 is composed of a 'Traffic Control Info' field that indicates whether the following fields 851, 852 and 841*b* are valid.

The DL TID Bitmap Valid subfield 853 (respectively UL TID Bitmap Valid subfield 854) indicates if the 'Restricted TWT DL TID Bitmap' field 851 (respectively 'Restricted TWT UL TID Bitmap' field 852) has valid information. Those fields are of less importance for the invention as they identify TIDs as latency sensitive traffic.

The 'SCSID Valid' 855 subfield indicates if the SCSID field 841*b* has valid information. When the value is set to 0, it indicates that no SCS is identified as latency sensitive traffic for the present TWT IE, and the SCSID field 841*b* is reserved. A value of 1 indicates that the present TWT IE relies to a SCS stream identified by the SCSID value of 841*b*.

When valid, the SCSID field 841*b* in a Restricted TWT Traffic Info field is always set to a non-zero value.

The SCSID field 841*b* is mutually exclusive against TID bitmaps 851 and 852. That is to say that the present TWT IE refers either to a TID flow or to a SCSID stream (not both).

As the context of rTWT Traffic Info relies to a Broadcast TWT, one may consider the need to indicate various SCS streams. Therefore, the SCSID subfield 841*b* (not shown in the figure) could be composed of several SCSID fields (1-byte each), prefixed with a length or numbering indication field, indicative of the SCSID fields to follow.

The TWT IE 800 including SCSID information can included in the Beacon frame to indicate a broadcast TWT SP during which the AP intends to send Trigger frames for the SCS stream identified by SCSID.

A non-AP STA MLD may request to become a member of a broadcast/individual TWT by transmitting a TWT Request frame to its associated AP MLD that contains a TWT element 800.

Figure 8C:
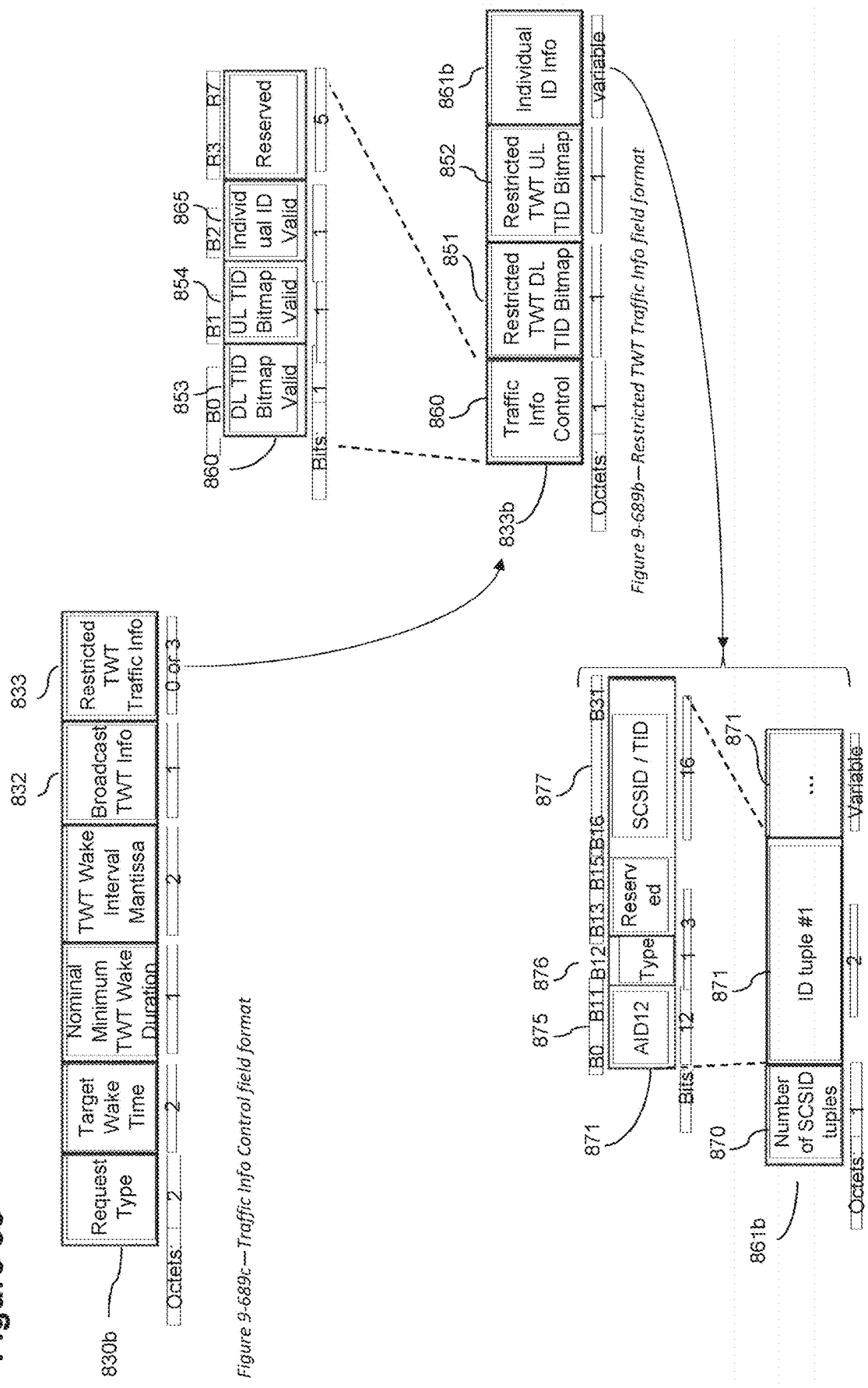
FIG. 8c illustrates a format of a TWT IE, alternative to the format of FIG. 8b, according to embodiments of the invention.

FIG. 8c illustrates a format of a TWT IE, alternative to the format of FIG. 8b, according to embodiments of the invention.

As already stated, the Broadcast TWT addresses several EHT stations to provide a reserved service period, common to these stations. As a result, the SP can only specify a global policy, common to all scheduled STAs, for low latency traffic differentiation:

The Restricted TWT DL TID Bitmap 851 and Restricted TWT UL TID Bitmap 852 subfields specify which TID(s) are identified by the TWT scheduling AP or the TWT scheduled STA as latency sensitive traffic streams in the downlink and uplink direction, respectively, but this specification is the same for all TWT stations.

The SCSID subfield 841*a* or 841*b* (or in an alternative not shown in the FIG. 8b, several SCSID subfields) indicates values that could be used by several non-AP TWT stations. This is due to the fact that an SCSID value is a non-zero value chosen by the non-AP STA identifying the SCS stream specified in the SCS Descriptor element delivered by the non-AP station to its AP. This results in that an SCSID value is unique in point of view of a non-AP STA, but not for the AP (several STAs can select a same SCSID value, starting from 0, to specify their own traffic streams).

FIG. 8c provides an updated format for Restricted TWT Traffic Info field 833, wherein individual identifications are supported: that is to say that a TWT scheduled STA can discover the stream identification that is intended to itself and would not be misled by identifications relying to other stations. Accordingly, some stations may use a TID based identification of LL flows, while others may use a SCSID based identification within the same service period.

The new format 833b contains a new field "Individual ID Info" 861b, of variable size, in replacement of 841b.

The 'Individual ID Valid' subfield 865 indicates if the "Individual ID Info" 861b is valid or not. When valid, the "Individual ID Info" 861b in a Restricted TWT Traffic Info field 833b is always set to a non-zero value.

Preferably, the "Individual ID Info" 861b is mutually exclusive against TID bitmaps 851 and 852. That is to say that the present TWT IE refers either to a global TID flow selection or to an individual ID stream for given STA(s).

As alternative, if both are present, "Individual ID Info" 861b information takes precedence towards TID bitmaps 851 and 852: that is to say that a TWT STA discovering an identified stream inside the "Individual ID Info" 861b will thus ignore TID bitmaps 851 and 852. This alternative embodiment makes a Broadcast TWT SP able to serve individual STA's flows with the same flexibility that would be achieved by individual TWTs (Individual TWT Parameter Set field 830a).

The 'Individual ID Valid' 865 subfield is composed as follows:

The "Number of SCSID tuples" subfield 870 indicates the number of tuples 875 in the "Individual ID Info" field 861b.

A series of (preferably at least one) "ID tuple" fields 871, that each indicates a stream identification corresponding a non-AP TWT STA.

An "ID tuple" field 871 is two bytes length, and is composed of the following:
an AID12 subfield, that is equal to the 12 LSBs of the AID of the non-AP TWT scheduled STA (typically set to a value between 1 and 2006);
A Type subfield 876, that identifies the identification variant
A SCSID/TID subfield 877, which is an identification value, in the context of the TWT non-AP scheduled STA, that represents either a TID or an SCSID flow.

For example, the coding of Type subfield 876 is equivalent as the Trigger Dependent Type subfield 761 previously described in the context of a Trigger Frame according to embodiments of the invention.

| Type Subfield value | Tuple identification variant |
|---|---|
| 0 | SCSID/TID subfield (B28 to B31) represents a TID value |
| 1 | SCSID/TID subfield (B16 to B31) represents an SCSID value |

It shall be noted that each ID Tuple is independent: one may refer to a TID variant, while a second one may refer to an SCSID variant.

The TWT IE 800 including this format 833b is preferably included in the Beacon frame to indicate individual identification of streams that are intended to be scheduled during a broadcast TWT SP. As a result, each TWT scheduled STA is able to determine in advance that an rTWT scheduled SP is addressed to specific low latency data traffic, as requested by the non-AP STA through an initial SCS request mechanism.

By providing precise identification of low latency streams per station, an rTWT broadcast SP will be more efficient as only adequate traffic is to be transmitted. Such a precise identification avoids misleading the scheduled STAs in the rTWT service. For example, a bad identification of streams may cause a STA to wake up for a rTWT SP for delivering other traffic data or even worse, no traffic data.

In addition, having a similar identification in complementary mechanism such as rTWT IE and Trigger Frame aims to simplify and harmonize the low latency traffic differentiation per station, so that both high-end station device and low-end devices may be contemplated.

Figure 9:
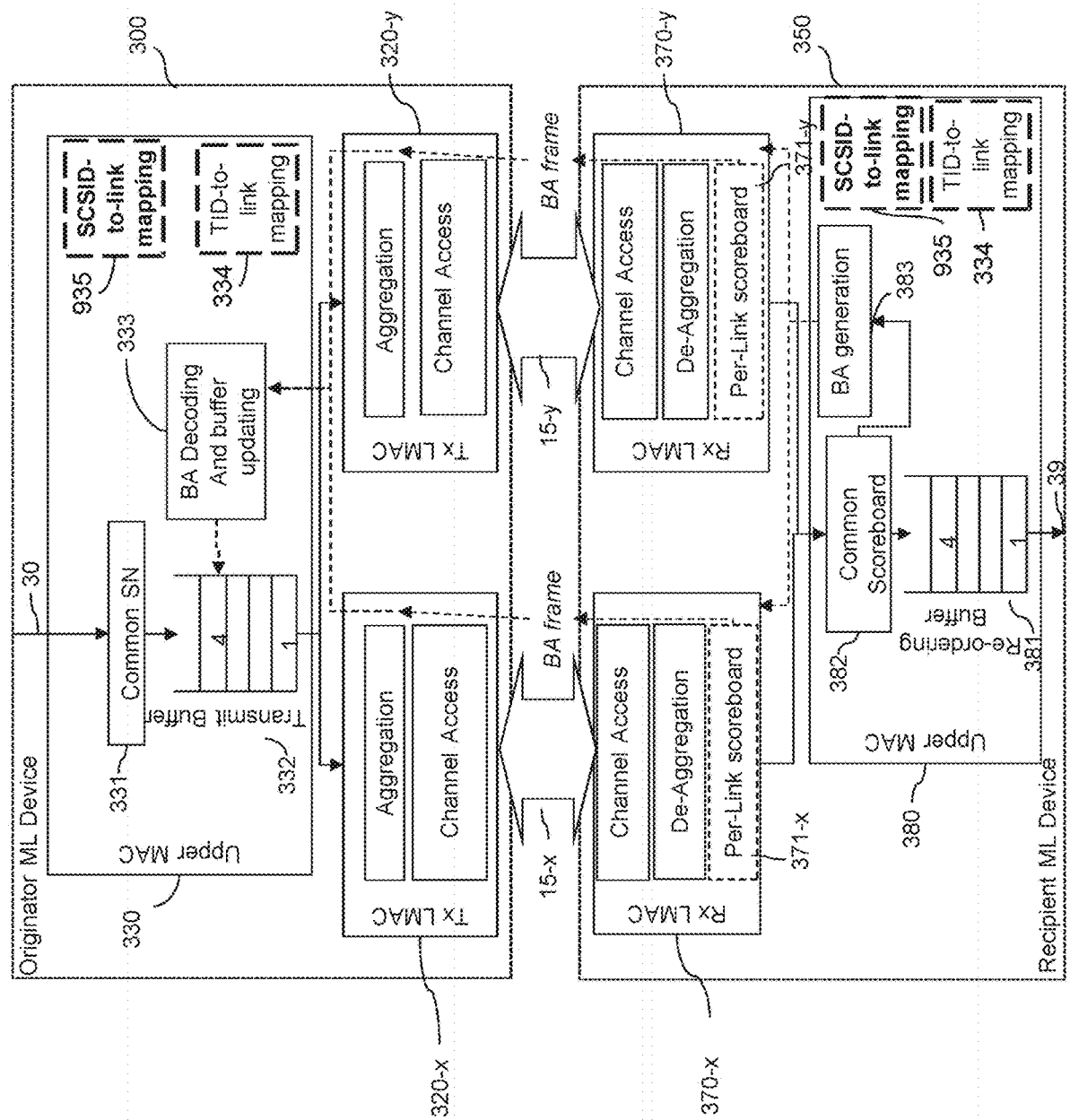
FIG. 9 illustrates a detailed architecture of ML devices according to embodiments of the invention.

FIG. 9 illustrates an alternative detailed architecture of ML devices according to embodiments of the invention.

This figure aims at describing the use of same sequence numbering for data of a traffic stream identified by its SCSID than their equivalent type (TID) inside an AC. The serial number of oncoming MSDUs remains in order within a tx queue, but as the delivery can be inside a restricted TWT period, the sequences are disordered in UMAC 380 to deliver quickly the LL traffic 39.

According to the invention, the UMAC 430 needs to correctly direct or route the data units belonging to an SCS stream according to the SCSID-to-link mapping. The SCSID-to-link mapping module 350 performs such switching.

All the data traffic coming from the upper layers may be subject to common sequence numbering and then a link mapping. Preferably, all traffic follows the TID-to-link mapping and then the SCSID-to-link mapping. The SCSID-to-link mapping is thus formed of a subset of link allowed by the TID-to-link mapping. This provides means for storing the SCS data in the same AC as data of same TID.

In a variant, the data traffic belonging to a setup SCS may be only subject to the SCSID-to-link mapping. This provides means for buffer differentiation at the emitter side (that is to say a distinct queue is used to store the SCS stream before transmission).

In a preferred embodiment, the Block-acknowledgment policy is established for both variants. Indeed, the acknowledgment scheme or policy is usually defined at a TID level. It means that a (e.g. low-latency) subpart of the TID (traffic stream belonging to an SCSID) is exchanged over the specific link or links according same acknowledgment bitmaps as the remaining part of TID data.

A received BA frame is used by the originator ML device to remove acknowledged data units (MPDUs and so the corresponding encapsulated MSDUS) therefrom based on their acknowledgment sequence by the recipient. In the multilink context with at least two links active, only the 1-value of the bits in the bitmaps/scoreboards is significant: it indicates the corresponding data unit has been correctly received. The 0-value is no longer significant as it only indicates the data unit has not yet been received, however without specifying whether it was lost or not yet arrived (because transmitted over another link). This sharply contrasts with the legacy behavior (of oldest IEEE 802.11 versions), wherein each successive bit value in the BA bitmap defines the acknowledgment status of each successive data unit starting from the SSN (Starting Sequence Number-identified in BA frame).

Thus, even if data from a SCS stream is transmitted in advance to remaining data of same TID, the 0-value in the ACK bitmap has no side effect.

Based on the received BA bitmaps/scoreboards, buffer updating module 333 removes the data units correctly received by the recipient (i.e. those whose bit in the BA bitmap has a 1-value). This operation frees space in the transmit buffer(s) 332 to allow new data 30 to populate the buffer(s) in order to be transmitted.

Traditionally, at the recipient side, the received data units are reordered upon arrival in the UMAC 380 and then stored in the re-ordering buffer 381 in the original order. The receive reordering buffer operation is based on the Sequence Number space that is shared between the two ML devices.

According to some aspects of this disclosure, in the re-ordering buffer 381, the low-latency data units cannot be delivered to the upper layers as long as all the preceding data units (regardless of whether they are low-latency data units and/or data units with a high level of reliability) have been correctly received and delivered. This phenomenon is called Head-of-Line Blocking problem in FIFO queues. Head of Line blocking is known to reduce the efficiency of MAC protocol in term of latency delivery.

In this context, there is a need to facilitate the transmission of low-latency data units of a SCSID when a multilink operation is performed for a SCS stream. It is proposed that MSDUs belonging to an SCS do not pass through re-ordering buffer 381, but instead they are sent to the upper layers without waiting that all the preceding data units have been correctly received, and thus they improve low-latency quality for the high level applications.

In addition, the sequence number of SCS data is still given to the re-ordering buffer 381, in order that the module will detect those pending MSDUs that can be delivered in-order upon new sequences arrival. This also aims to inform of holes in sequence numbering for MSDUs belonging to the SCS stream, in order that MSDUs that are not part of the SCS stream would not wait for a missing SCS MSDU that has been already delivered.

FIG. 10a illustrates, using a flowchart, an exemplary embodiment of the invention implemented at a non-AP MLD, that intends to request a SCS stream communication according to embodiments of the invention.

The following operation are performed by a non-AP MLD, and the transmission of management frames towards the AP MLD are emitted on any link that is active (in other words, the non-AP MLD selects any of its affiliated STA that is active).

At step 1010, MLME-SCS.request primitive is received locally from an upper application, and it requests transmission of an SCS Request frame to an AP.

The non-AP MLD (by use of a one designated affiliated STA) requests use of SCS by sending an SCS Request frame that includes an ML-SCS Descriptor element with the Request Type field set to "Add" or "Change." The SCS Descriptor List field in the ML-SCS Descriptor element identifies how MSDUs are classified according to the local application provider and the priority to assign to MSDUs that match this classification.

The SCS descriptor also informs of the direction of data carried by the specified stream (typically uplink in the present case) in Direction subfield 551.

If the requested SCS is accepted by the AP, the non-AP STA shall process subsequent incoming local MSDUs to determine if they match classification as specified in the SCS Descriptor element.

At step 1012, the affiliated STA of non-AP MLD starts a TWT negotiation with the AP MLD, namely a restricted TWT (rTWT) negotiation as it concerns LL traffics. A restricted TWT agreement may be established using the same procedure used to set up a broadcast TWT agreement. Note that individual TWT agreement is also possible. A TWT Request frame is emitted with the TWT IE 800 having a specification of SCSID according to any variant of FIG. 8b.

After successfully completing the negotiation, the non-AP MLD (acting as a TBTT scheduled STA) may go to doze state on certain links (those informed in TWT IE 800 by ML-SCS Descriptor) until its timing synchronization function (TSF) matches the next negotiated wake TBTT provided that the STA is in power save mode, and no other condition requires the affiliated STA(s) to remain awake on those negotiated TWT links. The TBTT scheduled STA shall be in the awake state to listen to Beacon frames transmitted at negotiated wake TBTTs.

FIG. 10b illustrates, using a flowchart, an exemplary embodiment implemented at a scheduling AP MLD, after the AP MLD has received a multi-link SCS request according to embodiments of the invention.

Upon receipt of an ML-SCS Request frame from an associated non-AP MLD (step 1050), the AP shall respond with a corresponding SCS Response frame. A value of SUCCESS shall be set in the corresponding Status field of the SCS Status in the SCS Response frame when the AP MLD accepts the ML-SCS request for the requested SCSID.

At step 1051, the AP MLD (acting as a TWT scheduling AP) receives a TWT request from a STA affiliated to a non-AP MLD.

The AP MLD accepts the TWT agreement with STA and confirms the acceptance in the TWT response sent to the non-AP MLD. The scheduling AP MLD also includes a broadcast TWT element 800 in the Beacon frame its sends. Therefore, a non-AP MLD can obtain TWT parameter (updated) values for the requested SCSID from the most recently received TWT element carried in a Beacon frames.

Upon reception of a request to terminate a previously accepted traffic stream (not illustrated in the flowchart), the AP MLD shall cease to apply the classifier related to this SCSID. The AP MLD shall send an SCS Response frame to confirm the termination of the traffic stream identified by the SCSID, by including the SCSID and a value of "Terminate" in the Status field of an SCS Status in an SCS Response frame. Such an SCS Response frame shall not contain any TSPEC element.

The AP shall also tear down a TWT agreement by sending a TWT Teardown frame.

As a result, negotiations to become a member of or terminate membership in a rTWT, are performed with an exchange of frames that carry TWT elements 800.

The present example discloses trigger-enabled rTWT agreement that schedules for transmission a Trigger frame for the non-AP MLD, within each TWT SP for that rTWT agreement related to a traffic stream (the Trigger frame may be replaced by a frame carrying a TRS Control subfield provided that the frame is carried in a DL MU PPDU and the AP allocates enough resources in the HE TB PPDU for the STA).

FIGS. 10c and 10d illustrates, using a flowchart, embodiments of the invention implemented at a scheduled station (non-AP MLD) and at a scheduling station (AP MLD) during a rTWT SP.

It is recalled that non-AP MLD wake to receive the Beacon frames to determine the broadcast rTWT.

The TWT scheduled STA (non-AP MLD) shall be in the awake state on the indicated link and at the TWT start times for which the STA has an agreement.

The AP MLD schedules the transmission of a Trigger frame during the rTWT SP. It may schedule delivery of individually addressed DL MSDUs. The Trigger frame (step 1061) shall contain at least one User Info field addressed to a TWT scheduled non-AP MLD and that triggers PPDU related to the SCSID. Trigger Format 740 is used.

The non-AP MLD scheduled STA is in charge of selecting appropriate data (that is to say data belonging to the traffic stream as identified by SCSID) and of forming a TB PPDU as response (steps 1021 and 1022).

Preferably, only data related to the traffic stream (identified by SCSID) is allowed to be part of TB PPDU. This ensures fairness for all remaining non-LL data in AC queues, as no other traffic (TID) takes advantage in medium access.

Optionally, if the TSPEC information is not enough significant for qualifying the amount of pending data for a traffic stream for a current LL SP (e.g. the Minimum Service Interval and the Maximum Service Interval fields are provided), then the TWT scheduling AP may schedule for transmission at the start of the LL TWT SP a trigger frame for buffer status reporting (BSRP). Such BSRP TF has the same format as 700, except the Trigger Type (inside Common Info field 710) is of BSR type value (value '4') and that the Trigger Dependent User Info subfield is present and flows format 740. Optionally, the BSRP TF follows the legacy format (that is to say Trigger Dependent User Info subfield is present), but the non-AP MLD scheduled STA(s) may inform of pending data for the traffic stream in relation with the TWT LL SP (SCSID context is known).

FIG. 11*a* schematically illustrates a communication device 1100, either a non-AP MLD, embedding a plurality of non-AP stations 110, or an AP MLD, embedding a plurality of APs 100, of a radio network NETW, configured to implement at least one embodiment of the present invention. The communication device 1100 may preferably be a device such as a micro-computer, a workstation or a light portable device. The communication device 1100 comprises a communication bus 1113 to which there are preferably connected:

a central processing unit 1101, such as a processor, denoted CPU;
a memory 1103 for storing an executable code of methods or steps of the methods according to embodiments of the invention as well as the registers adapted to record variables and parameters necessary for implementing the methods; and
at least one communication interface 1102 connected to a wireless communication network, for example a communication network according to one of the IEEE 802.11 family of standards, via transmitting and receiving antennas 1104.

Preferably the communication bus provides communication and interoperability between the various elements included in the communication device 1100 or connected to it. The representation of the bus is not limiting and in particular the central processing unit is operable to communicate instructions to any element of the communication device 1100 directly or by means of another element of the communication device 1100.

The executable code may be stored in a memory that may either be read only, a hard disk or on a removable digital medium such as for example a disk. According to an optional variant, the executable code of the programs can be received by means of the communication network, via the interface 1102, in order to be stored in the memory of the communication device 1100 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 11*b* is a block diagram schematically illustrating the architecture of the communication device 1100, adapted to carry out, at least partially, the invention. As illustrated, device 1100 comprises a physical (PHY) layer block 1123, a MAC layer block 1122, and an application layer block 1121.

The PHY layer block 1123 (here a multiple of 802.11 standardized PHY layer modules) has the task of formatting, modulating on or demodulating from any 20 MHz channel or the composite channel, and thus sending or receiving frames over the radio medium NETW, such as 802.11 frames, for instance medium access trigger frames to reserve a transmission slot, MAC data and management frames based on a 20 MHz width to interact with legacy 802.11 stations, as well as of MAC data frames of OFDMA type having smaller width than 20 MHz legacy (typically 2 or 5 MHZ) to/from that radio medium.

The MAC layer block or controller 1122 preferably comprises a MLE MAC 802.11 layer 1124 implementing conventional 802.11 MAC operations, and additional block 1125 for carrying out, at least partially, embodiments of the invention. The MAC layer block 1222 may optionally be implemented in software, which software is loaded into RAM 1003 and executed by CPU 1001. The MLE MAC 802.11 layer 1124 may implement an Upper-MAC stack 230 along with a series of Lower-MAC modules 220-*x/z*.

Preferably, the additional block 1125, referred to as Multi-Link Stream Classification Service management module for performing low-latency service over multi-link communications, implements part of embodiments of the invention (either from station, non-AP MLD, perspective or from AP, AP MLD, perspective). This block performs the operations of FIG. 10*a*/10*b* or 10*c*/10*d*, depending on the role of the communication device 1100, non-AP or AP MLD.

MAC 802.11-layer 1124 and Report management module 1125 interact one with the other in order to establish and process accurately communications over OFDMA RU in between multiple non-AP MLD stations according to embodiments of the invention.

On top of the FIG. 11, application layer block 1121 runs an application that generates and receives data packets, for example data packets such as a video stream. Application layer block 1121 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an"

does not exclude a plurality. The mere fact that different features are recited in mutually different dependent claims does not indicate that a combination of these features cannot be advantageously used.

The invention claimed is:

1. A communication method in a wireless network, comprising by a non-access point multi-link device, non-AP MLD, associated with an access point multi-link device, AP MLD:
    identifying a traffic stream by a stream classification service identifier, SCSID;
    reporting to the AP MLD one or more links on which the identified traffic stream is expected to be transmitted; and
    receiving from the AP MLD a trigger frame allocating resources for the transmission of one or more identified traffic streams,
    wherein the trigger frame comprises one element indicating that the trigger frame comprises a traffic stream identifier and one element indicating the traffic stream identifier.

2. The method of claim 1, wherein the one or more links are reported within respective one or more traffic specification elements, QoS Characteristics, in a stream classification service descriptor associated with the traffic stream.

3. The method of claim 2, wherein the traffic specification element comprises an identifier of the link in a field designed for indicating a traffic stream identifier.

4. The method of claim 1, wherein the one or more links is reported within the stream classification service descriptor comprises a mapping element indicating a direction for the traffic and one or more links on which the traffic stream is expected to be transmitted.

5. The method of claim 4, wherein the stream classification service descriptor comprises:
    one common traffic specification element comprising parameters defining the flow; and
    one or more link specific traffic specification elements comprising link specific parameters.

6. The method of claim 1, wherein a target wake time, TWT, is allocated for the transmission of the traffic stream.

7. The method of claim 6, wherein the target wake time is described by an information element, TWT IE comprising a parameter information element comprising a single individual TWT parameter field comprising an identifier of the traffic stream.

8. The method of claim 6, wherein the target wake time is described by an information element, TWT IE comprising a parameter information element comprising one or more broadcast TWT parameter field each comprising an identifier of the traffic stream.

9. The method of claim 1, wherein the traffic stream is transmitted using data units comprising sequential serial numbers.

10. A non-transitory computer-readable storage medium storing instructions of a computer program for implementing a method according to claim 1.

11. A communication device in a wireless network, comprising a non-access point multi-link device, non-AP MLD, associated with an access point multi-link device, AP MLD, wherein the non-AP MLD comprises a processor configured for:
    identifying a traffic stream by a stream classification service identifier, SCSID;
    reporting to the AP MLD one or more links on which the identified traffic stream is expected to be transmitted; and
    receiving from the AP MLD a trigger frame allocating resources for the transmission of one or more identified traffic streams,
    wherein the trigger frame comprises one element indicating that the trigger frame comprises a traffic stream identifier and one element indicating the traffic stream identifier.

* * * * *